(12) United States Patent
He

(10) Patent No.: US 12,050,838 B2
(45) Date of Patent: Jul. 30, 2024

(54) DISPLAY METHOD AND ELECTRONIC DEVICE

(71) Applicant: Huawei Technologies Co., Ltd., Shenzhen (CN)

(72) Inventor: Shujie He, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/044,919

(22) PCT Filed: Aug. 2, 2021

(86) PCT No.: PCT/CN2021/109989
§ 371 (c)(1),
(2) Date: Mar. 10, 2023

(87) PCT Pub. No.: WO2022/052662
PCT Pub. Date: Mar. 17, 2022

(65) Prior Publication Data
US 2023/0342105 A1 Oct. 26, 2023

(30) Foreign Application Priority Data
Sep. 10, 2020 (CN) .......................... 202010949251.X

(51) Int. Cl.
*G06F 3/14* (2006.01)
*G06F 21/83* (2013.01)
*H04M 1/72412* (2021.01)

(52) U.S. Cl.
CPC ............ *G06F 3/1454* (2013.01); *G06F 21/83* (2013.01); *H04M 1/72412* (2021.01)

(58) Field of Classification Search
CPC ............ G06F 3/1454; G06F 2221/032; G09G 2358/00
See application file for complete search history.

(56) References Cited

U.S. PATENT DOCUMENTS

2006/0212945 A1* 9/2006 Donlin .................... G06F 21/53
726/29
2015/0120817 A1* 4/2015 Jeong ..................... H04L 67/10
709/203
(Continued)

FOREIGN PATENT DOCUMENTS

| CN | 106203160 A | 12/2016 |
| CN | 107277243 A | 10/2017 |

(Continued)

OTHER PUBLICATIONS

Li Si-nan et al., Multi-label Data Mining: A Survey, Computer Science, Vol. 40, No. 4, Apr. 2013, with the English Abstract, 8 pages.

(Continued)

*Primary Examiner* — Sepehr Azari
(74) *Attorney, Agent, or Firm* — Conley Rose, P.C.

(57) ABSTRACT

A display method comprises a first device projecting a first window interface to a second device after receiving a screen projection instruction entered by a user. The first device receives an instruction for running a second window interface, and may send a task identity of the second window interface and a security protection instruction to the second device after determining that the second window interface includes a security flag bit. Further, the second device displays the first window interface and a security interface, where the security interface is a projected interface of the second window interface.

22 Claims, 32 Drawing Sheets

(56) References Cited

U.S. PATENT DOCUMENTS

| | | | |
|---|---|---|---|
| 2015/0278534 A1* | 10/2015 | Thiyagarajan | G06F 21/84 726/28 |
| 2016/0057090 A1 | 2/2016 | Faaborg | |
| 2018/0053003 A1* | 2/2018 | Nair | H04L 63/0457 |
| 2019/0095654 A1* | 3/2019 | Wang | G06F 21/84 |
| 2022/0147228 A1 | 5/2022 | Yi et al. | |
| 2022/0229624 A1 | 7/2022 | Xiong et al. | |
| 2023/0041287 A1 | 2/2023 | Tian et al. | |

FOREIGN PATENT DOCUMENTS

| | | |
|---|---|---|
| CN | 107885558 A | 4/2018 |
| CN | 108702414 A | 10/2018 |
| CN | 110134356 A | 8/2019 |
| CN | 110221798 A | 9/2019 |
| CN | 110312160 A | 10/2019 |
| CN | 110471639 A | 11/2019 |
| CN | 110708086 A | 1/2020 |
| CN | 111078168 A | 4/2020 |
| CN | 111107222 A | 5/2020 |
| CN | 111240547 A | 6/2020 |
| CN | 111310248 A | 6/2020 |
| WO | 2017193530 A1 | 11/2017 |
| WO | 2019134289 A1 | 7/2019 |

OTHER PUBLICATIONS

L. Shan, et al., "A Survey on the Application of Safety, Security, and Privacy Standards for Dependable Systems," 2019, 15th European Dependable Computing Conference (EDCC), Naples, Italy, 2 pages.

Liu Chang-ping, "Study on Dynamic Interface Layout for Android Application," 2013, 4 pages.

* cited by examiner

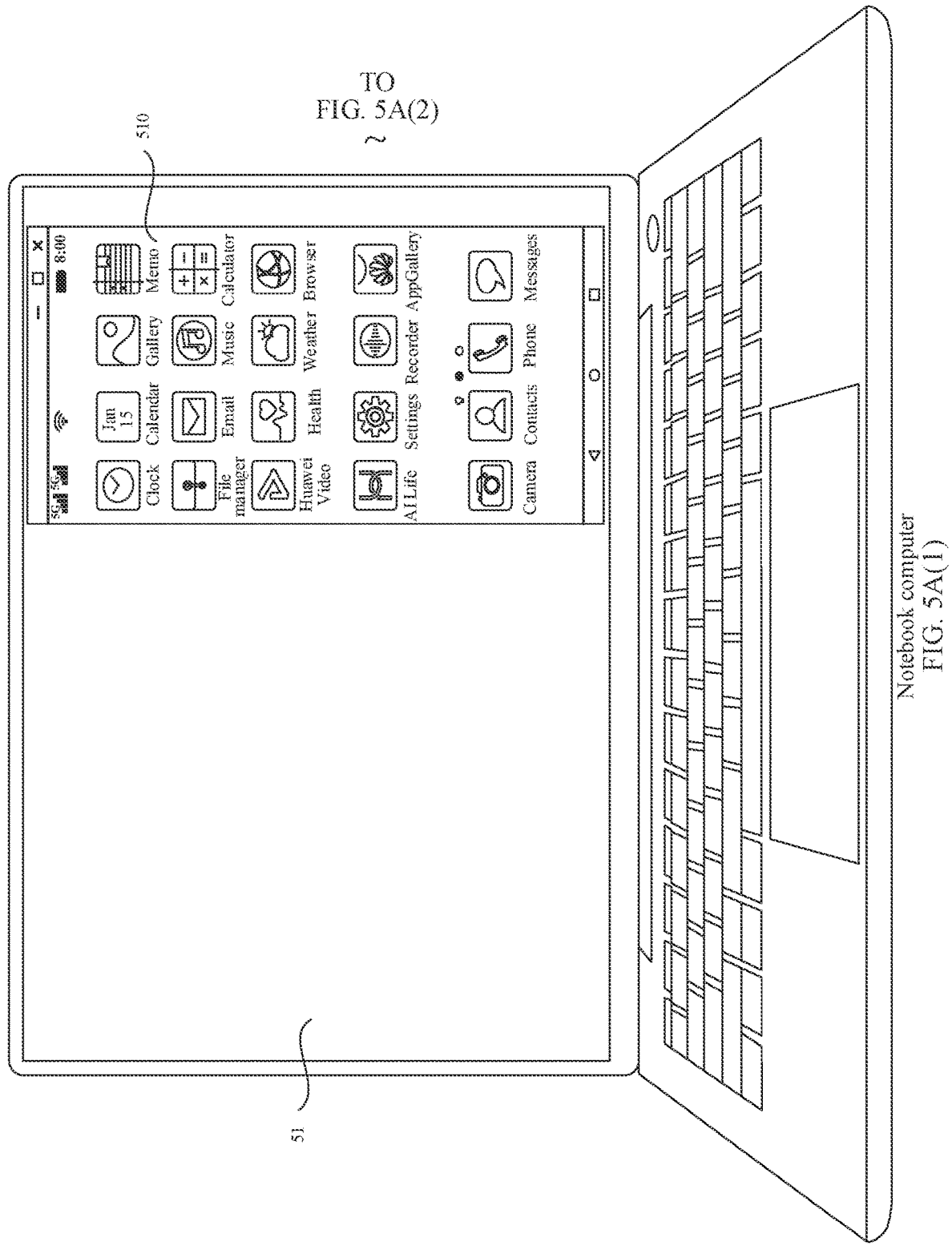

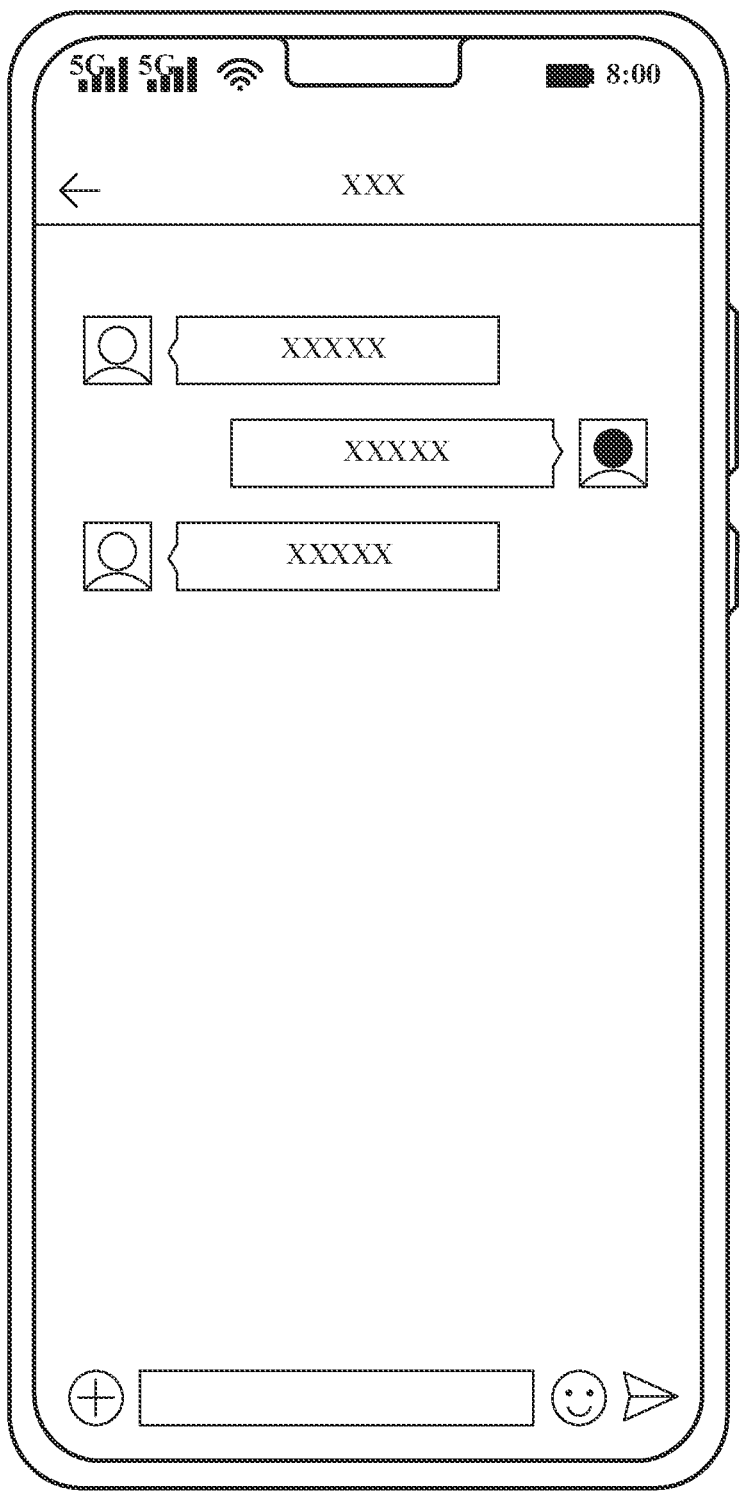
Mobile phone
FIG. 5A(2)

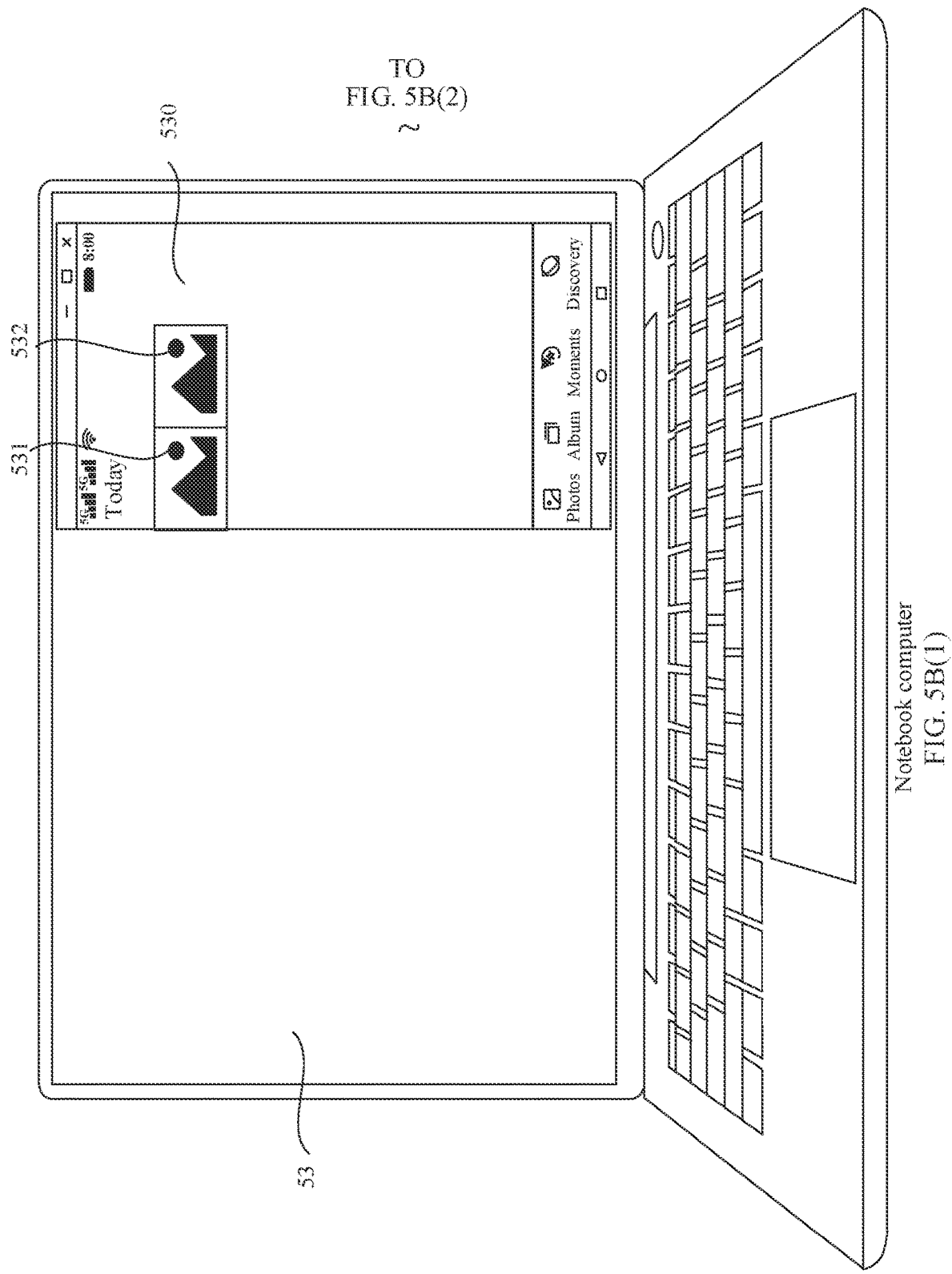

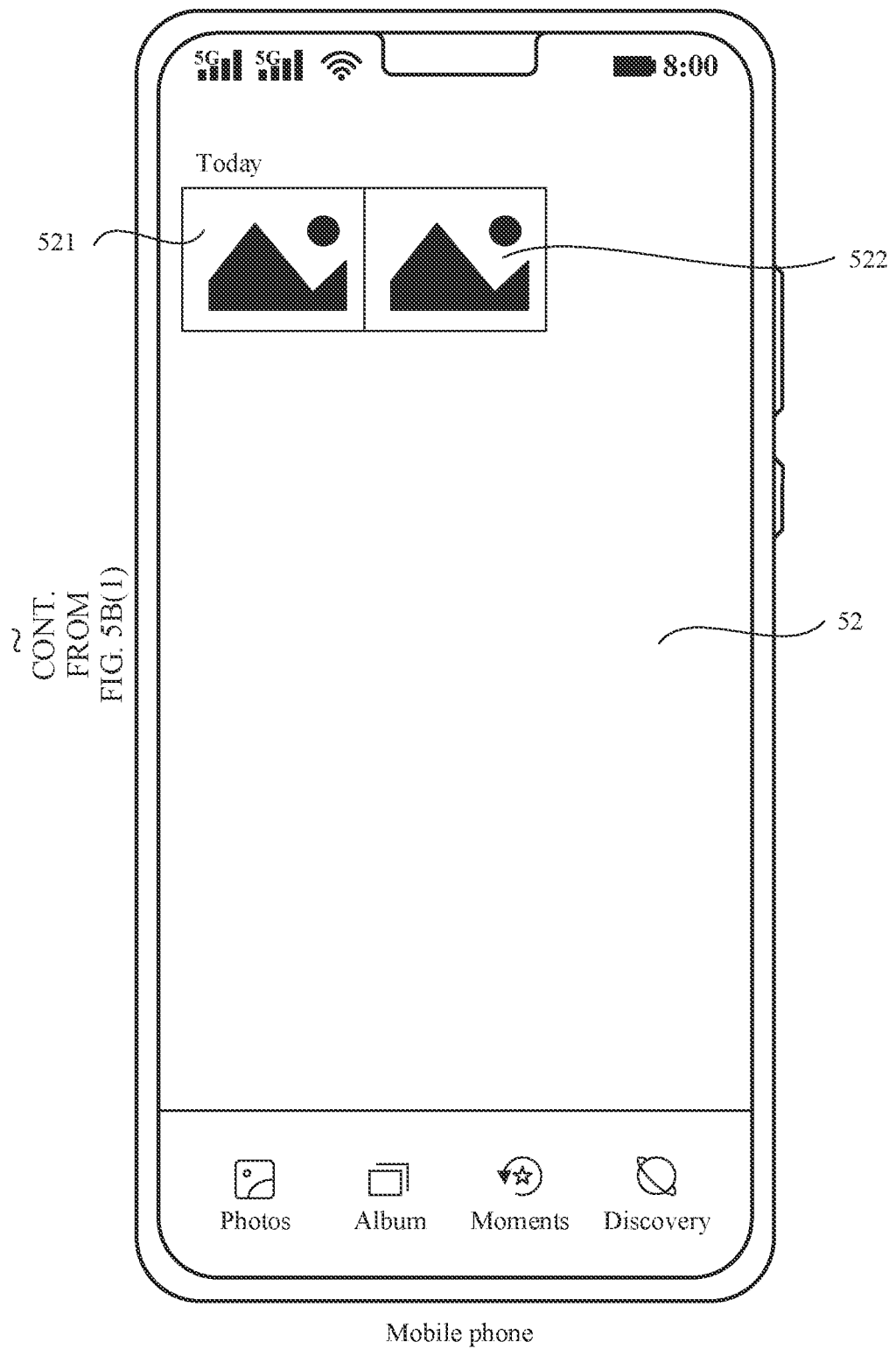
FIG. 5B(2)

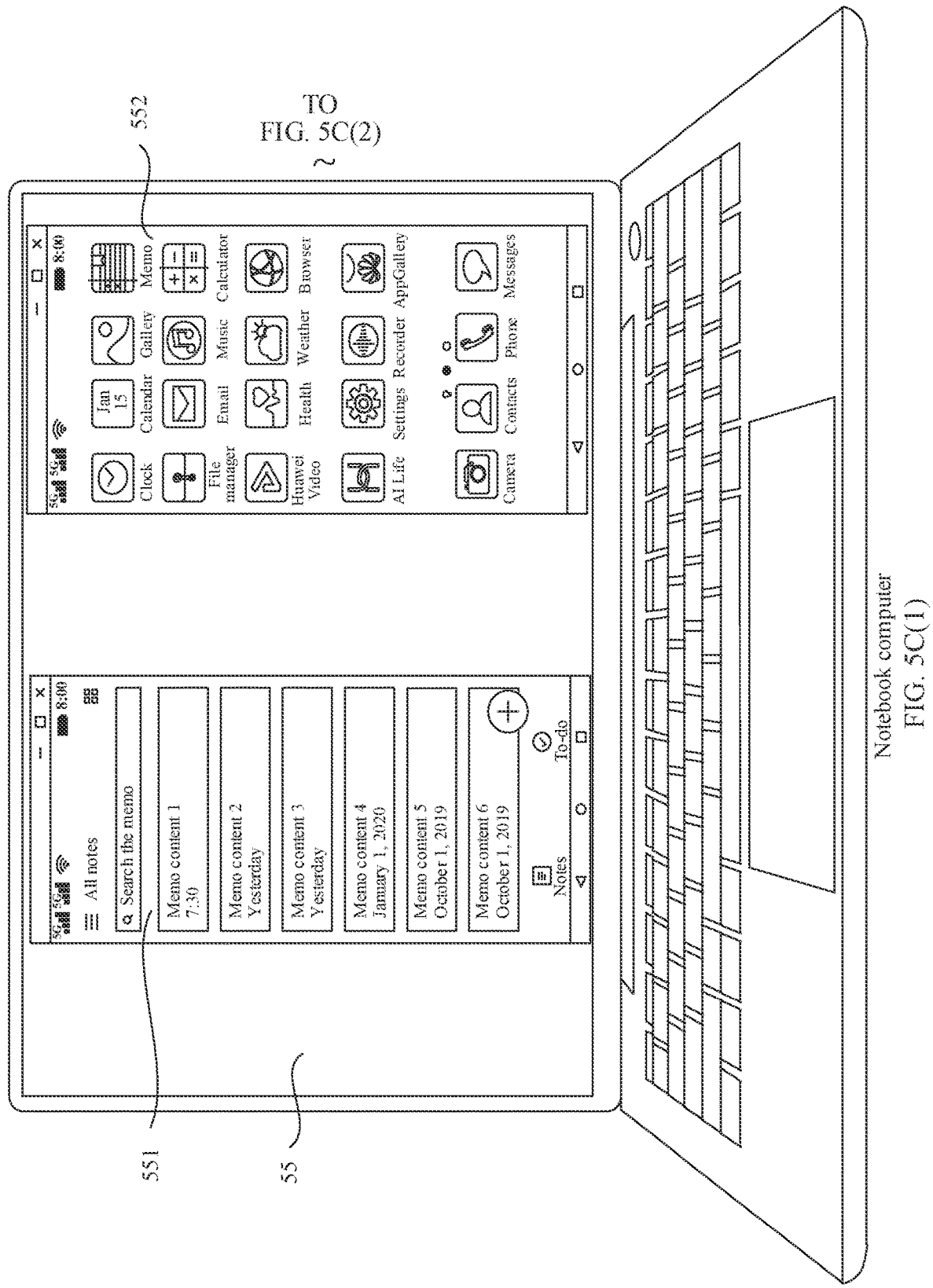

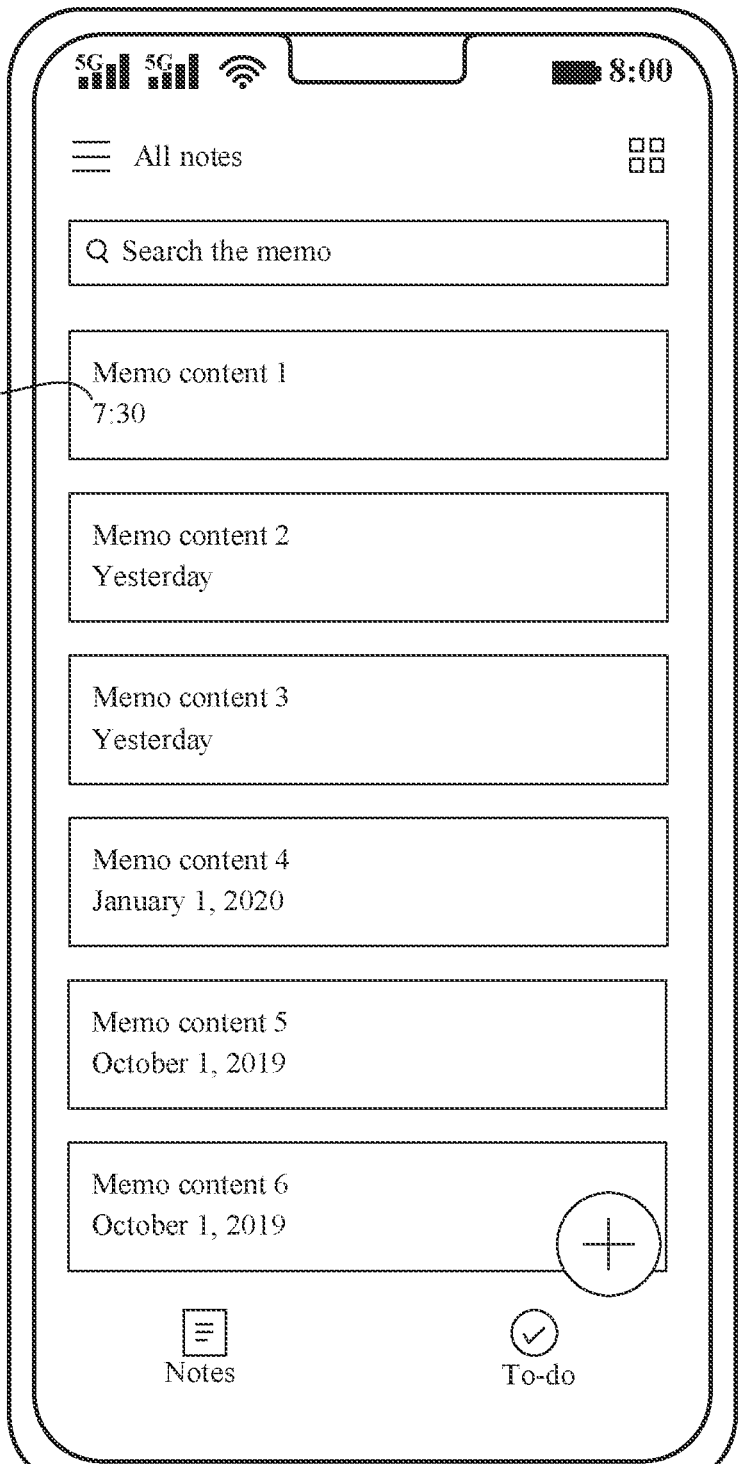
FIG. 5C(2)

DISPLAY METHOD AND ELECTRONIC DEVICE

CROSS-REFERENCE TO RELATED APPLICATIONS

This is a National Stage of International Patent Application No. PCT/CN2021/109989 filed on Aug. 2, 2021, which claims priority to Chinese Patent Application No. 202010949251.X filed on Sep. 10, 2020, both of which are hereby incorporated by reference in their entireties.

TECHNICAL FIELD

Embodiments of this application relate to the display field, and in particular, to a display method and an electronic device.

BACKGROUND

Screen projection is a technology used by a device 1 to transmit a window interface of the device 1 to a side of a device 2 for display. For example, as shown in FIG. 1A and FIG. 1B, a mobile phone may transmit a window interface of the mobile phone to a computer side for display. In this way, the computer may display a projected interface 01 for the window interface of the mobile phone on a screen side. A user can perform an operation on an application (application, APP) of the mobile phone on the projected interface 01.

An APP running on the mobile phone side includes an APP with a security requirement, for example, an APP that requires a user to enter a password. Based on this, in a screen projection scenario, a password entered on the mobile phone side is displayed on the computer, for example, a plaintext password, a quantity of characters of a password, or a biometric password is displayed, causing a privacy leakage risk to the user.

SUMMARY

Embodiments of this application provide a display method and an electronic device, to resolve a problem that a conventional display method causes poor user experience.

In embodiments of this application, a first device may project a plurality of window interfaces on the first device side to a second device.

According to a first aspect, an embodiment of this application provides a display method. The method includes: A first device receives a screen projection instruction entered by a user. The first device projects a first window interface to a second device in response to the screen projection instruction. The first device runs a second window interface in response to an instruction. The first device determines that the second window interface includes a security flag bit. The first device sends, to the second device, a task identity corresponding to the second window interface and a security protection instruction, where the security protection instruction is used to instruct the second device to display a projected interface for the second window interface as a security interface.

The first device may configure an application display (display), and configure a display policy, in the display, for a window interface running on the first device side, so that the first device may project a screen to the second device based on the display. In addition, the first device configures a task ID for an APP running on the first device side, to indicate a window interface of each APP.

In this embodiment of this application, before screen projection, the first device determines whether each window interface has a security requirement, and then the first device sends a task ID of each window interface and screen projection information of the window interface to the second device based on a detection result. The second device displays, based on the task ID, a security interface and a projected interface including content of the window interface, where the security interface is a projected interface for a window interface with a security requirement. In this way, the second device can securely display an interface with a security requirement, and it can also be ensured that the user performs a normal operation on an interface without a security requirement.

In a possible design, that the first device runs a second window interface in response to an instruction includes: The first device receives a first operation instruction from the second device, where the first operation instruction is associated with a first application APP, and the second window interface is a window interface of the first APP. The first device runs the first APP to start the second window interface. The first device may communicate with the second device based on a Wi-Fi Direct technology. In this way, the user can perform an operation on an APP of the first device on the second device side.

In a possible design, that the first device runs a second window interface in response to an instruction includes: The first device receives a second operation instruction entered by the user, where the second operation instruction corresponds to a first application APP, and the second window interface is a window interface of the first APP. The first device runs the first APP, and displays the second window interface.

In a possible design, after the first device sends, to the second device, the task identity corresponding to the second window interface and the security protection instruction, the method further includes: The first device receives a third operation instruction from the second device, where the third operation instruction includes the task identity corresponding to the second window interface. The first device displays the second window interface in response to the third operation instruction. The first device receives operation information entered by the user based on the second window interface. The first device updates the second window interface to a third window interface. The first device projects the third window interface to the second device. After the second device displays the projected interface for the second window interface as the security interface, the user may trigger, by using the second device, the second window interface to be displayed on a display screen of the first device, to continue to perform an operation on the second window on the first device side. The first device may determine the second window interface by using the task identity. In this implementation, the first device associates a window interface with a task ID, so that both the first device and the second device can determine the window interface by using the task ID, and the user can conveniently switch window interfaces displayed on the first device side and the second device side, thereby improving user experience.

In a possible design, that the first device determines that the second window interface includes a security flag bit includes: The first device invokes a window manager service of the first device to traverse a window state of the second window interface. If the window state of the second window interface includes a security flag flag, the first device determines that the second window interface includes the security flag bit.

In a possible design, the security flag includes a first flag flag, a second flag, and a third flag, where the first flag indicates an application security lock, the second flag indicates that setting is automatically performed by an application, and the third flag indicates that a security keyboard is invoked.

According to a second aspect, an embodiment of this application provides a display method. The method includes: A second device receives a video stream from a first window interface of a first device. The second device displays an image corresponding to the video stream, to obtain a projected interface for the first window interface. The second device receives a task identity and a security protection instruction from the first device. The second device displays the projected interface for the first window interface and a security interface.

In a possible design, after the second device displays the projected interface and the security interface for the first window interface, the method further includes: The second device receives a clicking/tapping instruction entered by a user, where the clicking/tapping instruction corresponds to the security interface. The second device generates an operation instruction, where the operation instruction includes the task identity. The second device sends the operation instruction to the first device.

According to a third aspect, an embodiment of this application provides an electronic device. The electronic device can implement a function of the first device in the foregoing method. The function may be implemented by hardware, or may be implemented by hardware executing corresponding software. The hardware or the software includes one or more modules corresponding to the function. In a possible design, a structure of the electronic device includes a processor and a transceiver. The processor is configured to perform processing, so that the electronic device performs a corresponding function of the first device in the foregoing method. The transceiver is configured to exchange information with a second device. The electronic device may further include a memory. The memory is configured to be coupled to the processor, and the memory stores program instructions and data that are necessary for the electronic device.

According to a fourth aspect, an embodiment of this application provides an electronic device. The electronic device can implement a function of the second device in the foregoing method. The function may be implemented by hardware, or may be implemented by hardware executing corresponding software. The hardware or the software includes one or more modules corresponding to the function. In a possible design, a structure of the electronic device includes a processor, a receiver, and a display device. The processor is configured to perform processing, so that the electronic device performs a corresponding function in the foregoing method. The transceiver is configured to exchange information with a first device. The display device is configured to display a projected interface and a security interface. The electronic device may further include a memory. The memory is configured to be coupled to the processor, and the memory stores program instructions and data that are necessary for the electronic device.

According to a fifth aspect, an embodiment of this application provides a computer storage medium. The computer storage medium stores instructions. When the instructions run on a computer, the computer is enabled to perform some or all steps of the display method in the first aspect, the second aspect, the possible implementations of the first aspect, and the possible implementations of the second aspect.

According to a sixth aspect, an embodiment of this application provides a computer program product. When the computer program product runs on a computer, the computer is enabled to perform some or all steps of the display method in the first aspect, the second aspect, the possible implementations of the first aspect, and the possible implementations of the second aspect.

BRIEF DESCRIPTION OF DRAWINGS

FIG. 5A(1) and FIG. 5A(2) are a schematic diagram of a first example interface in a screen projection scenario according to an embodiment of this application;

FIG. 5B(1) and FIG. 5B(2) are a schematic diagram of a second example interface in a screen projection scenario according to an embodiment of this application;

FIG. 5C(1) and FIG. 5C(2) are a schematic diagram of a third example interface in a screen projection scenario according to an embodiment of this application;

FIG. 5C-1 is an example schematic diagram of a display corresponding to a scenario shown in FIG. 5C(1) and FIG. 5C(2) according to an embodiment of this application;

FIG. 5C-2 is a schematic diagram of an example interface of a mobile phone in a scenario shown in FIG. 5C(1) and FIG. 5C(2) according to an embodiment of this application;

DESCRIPTION OF EMBODIMENTS

Figure 1A:
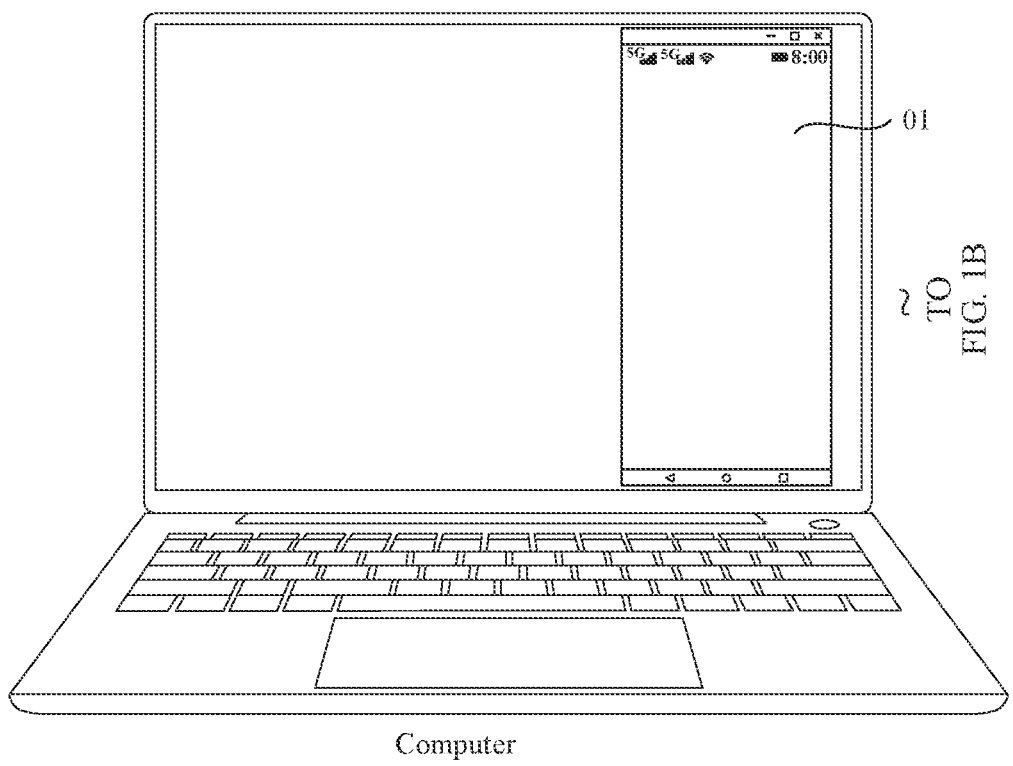
FIG. 1A and FIG. 1B are a schematic diagram of a typical screen projection scenario according to an embodiment of this application.
Figure 1B:
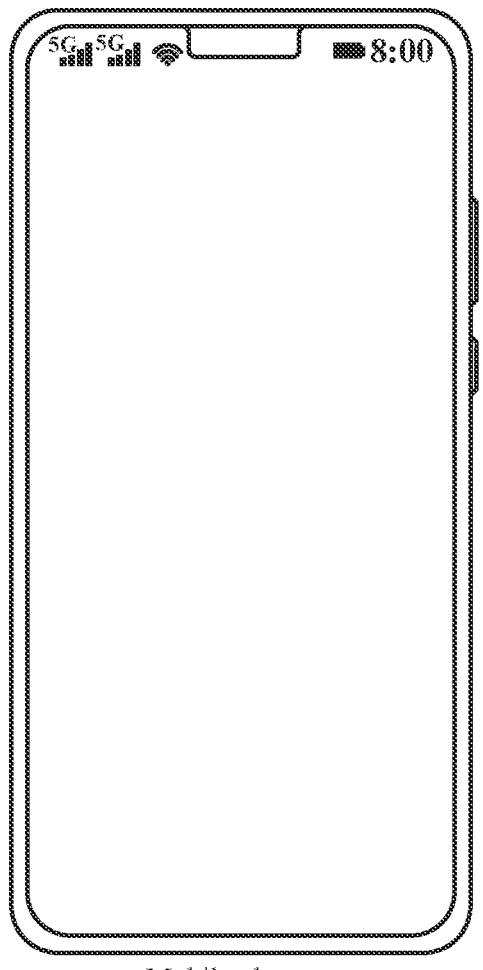

The following clearly describes technical solutions in embodiments of this application with reference to accompanying drawings in embodiments of this application.

Terms used in the following embodiments of this application are merely intended to describe specific embodiments, but are not intended to limit this application. Terms "one", "a", "the", "the foregoing". "this", and "the one" of singular forms used in this specification and the appended claims of this application are also intended to include plural forms, unless otherwise specified in the context clearly. It should be further understood that although the terms first, second, and the like may be used to describe a class of objects in the following embodiments, the objects should not be limited to these terms. The terms are merely used to distinguish between specific objects of this class of objects. For example, in the following embodiments, the terms first, second, and the like may be used to describe a device, but the device should not be limited to these terms. The terms are merely used to distinguish between different electronic devices. The same applies to other classes of objects that may be described by using the terms first, second, and the like in the following embodiments, and details are not described herein again.

Embodiments of this application provide a display method. The display method is applied to a scenario in which a first device projects at least two window interfaces to a second device. For a window interface without a security requirement, the second device displays content of the window interface. For a window interface with a security requirement, the second device displays a security interface. In this way, the second device can securely display an interface with a security requirement, and it can also be ensured that a user performs a normal operation on an interface without a security requirement.

The following describes the first device, the second device, user interfaces (user interface, UI) used for the first device and the second device, and embodiments of using the first device and the second device.

To clearly describe embodiments of this application, in this specification, an interface displayed on the first device is referred to as a "window interface", and the "window interface" is a display interface on which a size of a window is equal to a size of a display screen of the first device. In this specification, an interface displayed on the second device is referred to as a "projected interface", and each "projected interface" corresponds to one "window interface".

The first device in embodiments of this application may be an electronic device including a wireless communication module and a display function, for example, a mobile phone, a tablet computer, a wearable device (for example, a watch, a band, or a helmet), a vehicle-mounted device, an augmented reality (augmented reality. AR)/virtual reality (virtual reality. VR) device, a notebook computer, an ultra-mobile personal computer (ultra-mobile personal computer, UMPC), a netbook, a personal digital assistant (personal digital assistant, PDA), a smart home device (for example, a smart television), or other electronic devices. It may be understood that a specific type of the first device is not limited in embodiments of this application. The first device may be a device on which iOS®, Android®, Microsoft®, or another operating system is installed.

Figure 2A:
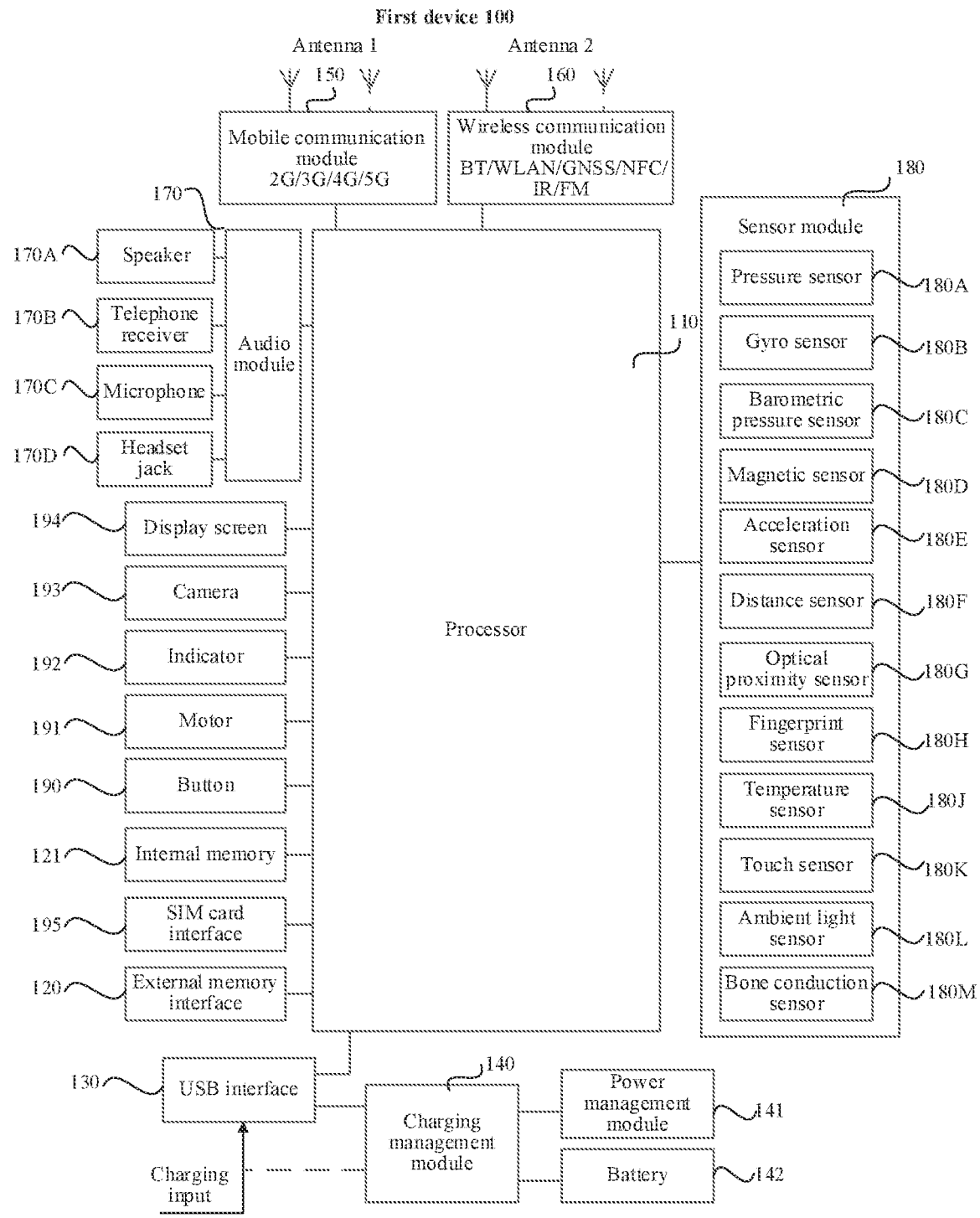
FIG. 2A is a schematic diagram of an example hardware structure of a first device 100 according to an embodiment of this application.

FIG. 2A is a schematic diagram of a hardware structure of a first device 100. The first device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a telephone receiver 170B, a microphone 170C, a headset jack 170D, a sensor module 180, a button 190, a motor 191, an indicator 192, a camera 193, a display screen 194, a subscriber identity module (subscriber identity module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the first device 100. In some other embodiments of this application, the first device 100 may include more or fewer components than those shown in the figure, or some components may be combined, or some components may be split, or there may be a different component layout. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors. In some embodiments, the first device 100 may alternatively include one or more processors 110.

The controller may be a nerve center and a command center of the first device 100. The controller may generate an operation control signal based on instruction operation code and a time sequence signal, to complete control of instruction detection and the like.

A memory may be further disposed in the processor 110, and is configured to store instructions and data. In some embodiments, the memory in the processor 110 is a cache memory. The memory may store instructions or data that has been used or is cyclically used by the processor 110. If the processor 110 needs to use the instructions or the data again, the processor may directly invoke the instructions or the data from the memory. This avoids repeated access and reduces a waiting time of the processor 110, thereby improving efficiency of the first device 100.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronous serial bus, and includes a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the first device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of listening to a sound by using a Bluetooth headset.

The PCM interface may also be configured to perform audio communication, and sample, quantize, and encode an analog signal. In some embodiments, the audio module 170 may be coupled to the wireless communication module 160 through the PCM bus interface. In some embodiments, the audio module 170 may also transmit an audio signal to the wireless communication module 160 through the PCM interface, to implement a function of listening to a sound by using a Bluetooth headset. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music by using a Bluetooth headset.

The MIPI interface may be configured to connect the processor 110 to a peripheral device such as the display screen 194 or the camera 193. The MIPI interface includes a camera serial interface (camera serial interface, CSI), a display serial interface (display serial interface, DSI), and the like. In some embodiments, the processor 110 communicates with the camera 193 t the CSI interface, to implement a photographing function of the first device 100. The processor 110 communicates with the display screen 194 through the DSI interface, to implement a display function of the first device 100.

The GPIO interface may be configured by using software. The GPIO interface may be configured as a control signal or a data signal. In some embodiments, the GPIO interface may be configured to connect the processor 110 to the camera 193, the display screen 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB type-C interface, or the like. The USB interface 130 may be configured to connect to a charger to charge the first device 100, or may be configured to transmit data between the first device 100 and a peripheral device, or may be configured to connect to a headset for playing audio through the headset. The interface may be further configured to connect to another electronic device such as an AR device.

It may be understood that an interface connection relationship between the modules shown in this embodiment of this application is merely an example for description, and does not constitute a limitation on the structure of the first device 100. In some other embodiments, the first device 100 may alternatively use an interface connection manner different from that in the foregoing embodiment, or a combination of a plurality of interface connection manners.

The charging management module 140 is configured to receive a charging input from a charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input through a wireless charging coil of the first device 100. The charging management module 140 may further supply power to the first device 100 by using the power management module 141 while charging the battery 142.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display screen 194, the camera 193, the wireless communication module 160, and the like. The power management module 141 may be further configured to monitor parameters such as a battery capacity, a quantity of battery cycles, and a battery health status (electric leakage and impedance). In some other embodiments, the power management module 141 may alternatively be disposed in the processor 110. In some other embodiments, the power management module 141 and the charging management module 140 may alternatively be disposed in a same device.

A wireless communication function of the first device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the first device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution applied to the first device 100 for wireless communication such as 2G/3G/4G/5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium- or high-frequency signal. The demodulator is configured to demodulate a received electromagnetic wave signal into a low-frequency baseband signal. Then the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the telephone receiver 170B, and the like), or displays an operation interface of an APP by using the display screen 194. In some embodiments, the modem processor may be an independent device. In some other embodiments, the modem processor may be independent of the processor 110, and is disposed in a same device as the mobile communication module 150 or another functional module.

The wireless communication module 160 may provide a wireless communication solution that is applied to the first device 100 and that includes a wireless local area network (wireless local area network, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more devices integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 of the first device 100 is coupled to the mobile communication module 150, and the antenna 2 is coupled to the wireless communication module 160, so that the first device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

In some embodiments, the wireless communication solution provided by the mobile communication module 150 can enable the first device 100 to communicate with a device (for example, a cloud server) in a network. The WLAN wireless communication solution provided by the wireless communication module 160 can also enable the first device 100 to communicate with a device (for example, a second device 200) in a network, so that the first device 100 transmits a video stream to the second device 200, to implement a function of projecting a screen from the first device 100 to the second device 200.

The first device 100 implements a display function by using the GPU, the display screen 194, the application processor, and the like. The GPU is a microprocessor for image processing, and is connected to the display screen 194 and the application processor. The GPU is configured to perform mathematical and geometric computation, and render an image. For example, the GPU may perform rendering to obtain an image used as a security interface. The processor 110 may include one or more GPUs that execute program instructions to generate or change an interface display effect. In this embodiment of this application, the display screen 194 may include a display device and a touch device. The display device is configured to output, to a user, displayed content such as a desktop page of the first device 100 and various operation interfaces of an APP. The touch device is configured to receive an operation instruction entered by the user on the display screen 194.

The display screen 194 includes a display panel. The display panel may be a liquid crystal display (liquid crystal display. LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diode, QLED), or the like.

In some embodiments of this application, the display screen 194 is foldable when the display panel is made of a material such as an OLED, an AMOLED, or an FLED. Herein, that the display screen 194 is foldable means that the display may be folded to any angle at any part and may be maintained at the angle. For example, the display screen 194 may be folded left and right in the middle, or may be folded up and down in the middle.

The first device 100 may implement a photographing function by using the ISP, the camera 193, the video codec, the GPU, the display screen 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated by using the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV.

The digital signal processor is configured to process a digital signal, and may process another digital signal in addition to the digital image signal. For example, when the first device 100 selects a frequency, the digital signal processor is configured to perform Fourier transform on frequency energy, and the like.

The video codec is configured to compress or decompress a digital video. In some embodiments, after the first device 100 is connected to the second device 200, the video codec may compress a video stream that needs to be projected to the second device 200, and then send a compressed video file to the second device 200. The first device 100 may support one or more audio codecs.

The NPU is a neural-network (neural-network, NN) computing processor, quickly processes input information by referring to a structure of a biological neural network, for example, by referring to a mode of transfer between human brain neurons, and may further continuously perform self-learning. Applications such as intelligent cognition of the first device 100 may be implemented by using the NPU, for example, image recognition, facial recognition, speech recognition, and text understanding.

The external memory interface 120 may be configured to connect to an external memory card, for example, a micro SD card, to expand a storage capability of the first device 100. The external memory card communicates with the processor 110 through the external memory interface 120, to implement a data storage function. For example, data such as music, a photo, and a video is stored in the external memory card.

The internal memory 121 may be configured to store one or more computer programs, and the one or more computer programs include instructions. The processor 110 may run the instructions stored in the internal memory 121, so that the first device 100 performs a display method provided in some embodiments of this application, various function applications, data processing, and the like. The internal memory 121 may include a program storage area and a data storage area. The program storage area may store an operating system. The program storage area may further store one or more applications (for example, a mailbox, a gallery, and a contact), and the like. The data storage area may store data (for example, a window interface identifier) created during use of the first device 100. In addition, the internal memory 121 may include a high-speed random access memory, or may include a nonvolatile memory, for example, at least one magnetic disk storage device, a flash memory, or a universal flash storage (universal flash storage, UFS).

The first device 100 may implement an audio function, for example, music playing and recording, by using the audio module 170, the speaker 170A, the telephone receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The first device 100 may listen to music or answer a hands-free call by using the speaker 170A.

The telephone receiver 170B, also referred to as an "earpiece", is configured to convert an electrical audio signal into a sound signal. When a call is answered or a voice message is listened to by using the first device 100, the telephone receiver 170B may be put close to a human ear to listen to a voice.

The microphone 170C, also referred to as a "mike" or a "mic", is configured to convert a sound signal into an electrical signal. When making a call or sending a voice message, the user may make a sound near the microphone 170C through the mouth of the user, to input a sound signal to the microphone 170C. At least one microphone 170C may be disposed in the first device 100. In some other embodiments, the first device 100 may be provided with two microphones 170C, to collect a sound signal and further implement a noise reduction function. In some other embodiments, the first device 100 may alternatively be provided with three, four, or more microphones 170C, to collect a sound signal, reduce noise, identify a sound source, implement a directional recording function, and the like.

The headset jack 170D is configured to connect to a wired headset. The headset jack 170D may be a USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display screen 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The first device 100 determines pressure intensity based on a capacitance change. When a touch operation is performed on the display screen 194, the first device 100 detects intensity of the touch operation based on the pressure sensor 180A. The first device 100 may also calculate a touch location based on a detection signal of the pressure sensor 180A. In some embodiments, touch operations that are performed at a same touch location but have different touch operation intensity may correspond to different operation instructions.

The gyro sensor 180B may be configured to determine a motion posture of the first device 100. In some embodiments, an angular velocity of the first device 100 around three axes (that is, axes x, y, and z) may be determined by using the gyro sensor 180B. The gyro sensor 180B may be configured to implement image stabilization during photographing. For example, when the shutter is pressed, the gyro sensor 180B detects an angle at which the first device 100 jitters, calculates, based on the angle, a distance for which a lens module needs to compensate, and allows the lens to cancel the jitter of the first device 100 through reverse motion, to implement image stabilization. The gyro sensor 180B may be further used in a navigation scenario and a somatic game scenario.

The barometric pressure sensor 180C is configured to measure barometric pressure. In some embodiments, the first device 100 calculates an altitude based on a barometric pressure value measured by the barometric pressure sensor 180C, to assist in positioning and navigation.

The magnetic sensor 180D includes a Hall sensor. The first device 100 may detect an orientation of the display screen 194 of the first device 100 by using the magnetic sensor 180D. In some embodiments, when the first device 100 is a device with a flexible screen, the first device 100 may detect a folded state and an unfolded state of the screen based on the magnetic sensor 180D.

The acceleration sensor 180E may detect accelerations in various directions (usually on three axes) of the first device 100, may detect a magnitude and a direction of gravity when the first device 100 is still, and may be further configured to identify a posture of the first device 100 and used in applications such as landscape/portrait mode switching and a pedometer.

The distance sensor 180F is configured to measure a distance. The first device 100 may measure a distance by using infrared or laser. In some embodiments, in a photographing scenario, the first device 100 may measure a distance by using the distance sensor 180F, to implement quick focusing.

The optical proximity sensor 180G may include, for example, a light emitting diode (LED) and an optical detector, for example, a photodiode. The light emitting diode may be an infrared light emitting diode. The first device 100 emits infrared light to the outside by using the light emitting diode. The first device 100 detects infrared reflected light from a nearby object by using the photodiode. When sufficient reflected light is detected, the first device 100 may determine that there is an object near the first device 100. When insufficient reflected light is detected, the first device 100 may determine that there is no object near the first device 100. The first device 100 may detect, by using the optical proximity sensor 180G, that the user holds the first device 100 close to an ear for a call, to automatically turn off a screen for power saving. The optical proximity sensor 1800 may also be used in a smart cover mode or a pocket mode to automatically perform screen unlocking or locking.

The ambient light sensor 180L is configured to sense ambient light brightness. The first device 100 may adaptively adjust brightness of the display screen 194 based on the sensed ambient light brightness. The ambient light sensor 180L may also be configured to automatically adjust white balance during photographing. The ambient light sensor 180L may further cooperate with the optical proximity sensor 180G to detect whether the first device 100 is in a pocket, to avoid an accidental touch.

The fingerprint sensor 180H is configured to collect a fingerprint. The first device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the first device 100 executes a temperature processing policy based on the temperature detected by the temperature sensor 1803. For example, when the temperature reported by the temperature sensor 180J exceeds a threshold, the first device 100 lowers performance of a processor near the temperature sensor 180J, to reduce power consumption and implement thermal protection. In some other embodiments, when the temperature is less than another threshold, the first device 100 heats the battery 142 to prevent the first device 100 from being shut down abnormally due to a low temperature. In some other embodiments, when the temperature is less than still another threshold, the first device 100 boosts an output voltage of the battery 142 to avoid abnormal shutdown due to a low temperature.

The touch sensor 180K may also be referred to as a touch panel or a touch-sensitive surface. The touch sensor 180K may be disposed on the display screen 194, and the touch sensor 180K and the display screen 194 form a touchscreen, which is also referred to as a "touch control screen". The touch sensor 180K is configured to detect a touch operation performed on or near the touch sensor. The touch sensor may transfer the detected touch operation to the application processor to determine a type of a touch event. A visual output related to the touch operation may be provided by using the display screen 194. In some other embodiments, the touch sensor 180K may alternatively be disposed on a surface of the first device 100 at a location different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may alternatively be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button or a touch button. The first device 100 may receive a key input, and generate a key signal input related to user settings and function control of the first device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display screen 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the first device 100. The first device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 is also compatible with different types of SIM cards. The SIM card interface 195 is also compatible with an external memory card. The first device 100 interacts with a network through the SIM card, to implement functions such as calling and data communication. In some embodiments, the first device 100 uses an eSIM, namely, an embedded SIM card. The eSIM card may be embedded in the first device 100, and cannot be separated from the first device 100.

A software system of the first device 100 may use a layered architecture, an event-driven architecture, a microkernel architecture, a micro service architecture, or a cloud architecture. In this embodiment of this application, an Android system with a layered architecture is used as an example to describe a software structure of the first device 100.

Figure 2B:
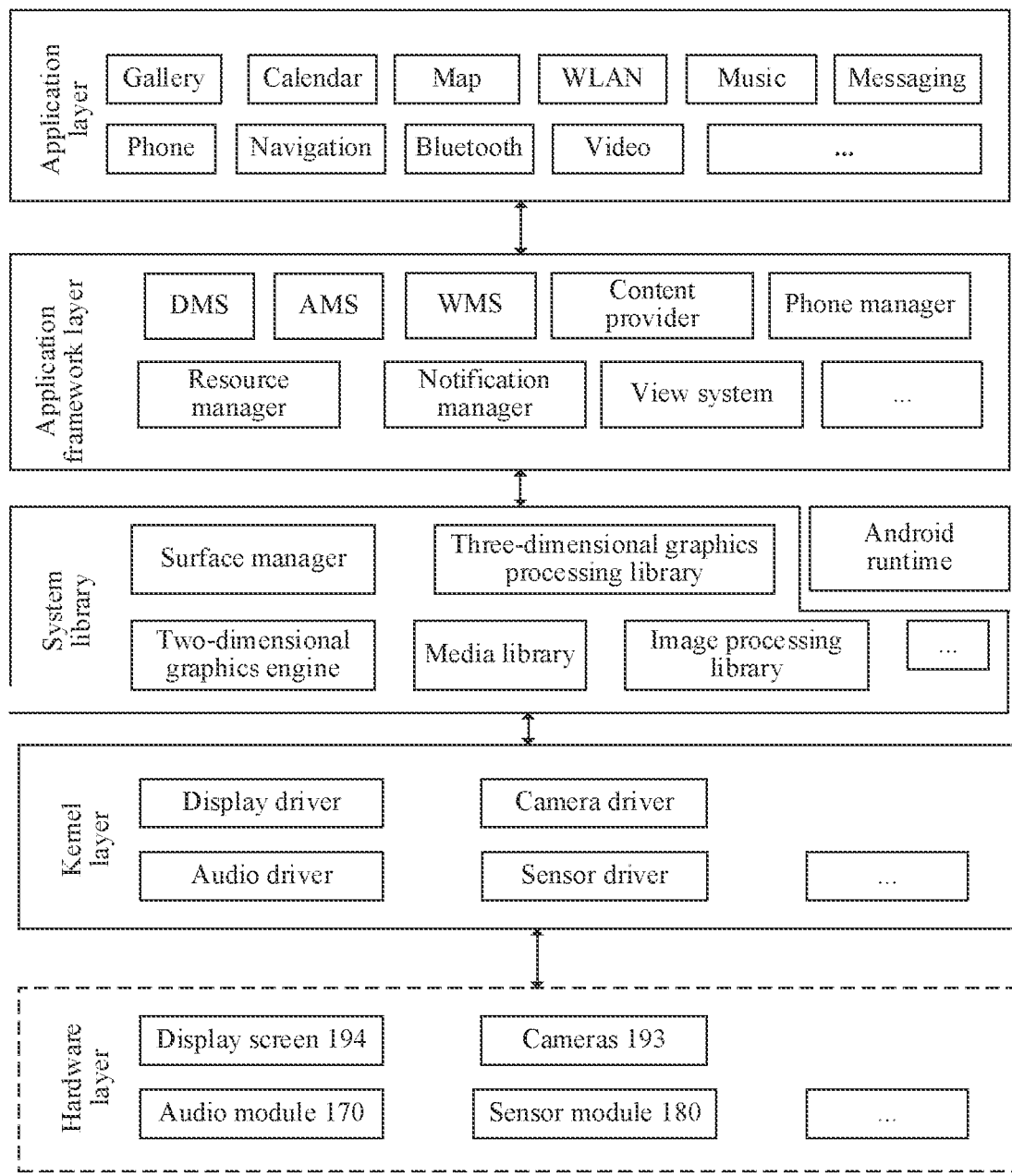
FIG. 2B is a schematic diagram of an example software architecture of a first device 100 according to an embodiment of this application.

FIG. 2B is a schematic diagram of a software structure of a first device 100 according to an embodiment of this application.

In a layered architecture, software is divided into several layers, and each layer has a clear role and task. The layers communicate with each other through a software interface. In some embodiments, an Android system includes an application layer, an application framework layer, an Android runtime (Android runtime) and system library, and a kernel layer from top to bottom.

The application layer may include a series of application packages.

As shown in FIG. 2B, the application packages may include applications such as Gallery, Calendar, Map, WLAN, Music, Messages, Phone, Navigation, Bluetooth, and Video.

The application framework layer provides an application programming interface (application programming interface, API) and a programming framework for an application at the application layer. The application framework layer includes some predefined functions.

As shown in FIG. 2B, the application framework layer may include a display manager service (display manager service, DMS), an activity manager service (activity manager service, AMS), and a window manager service (window manager service, WMS). The window manager service may also be referred to as a window manager. Certainly, the application framework layer may further include a content provider, a view system, a phone manager, a resource manager, a notification manager, and the like. This is not limited in this embodiment of this application.

The WMS may be configured to determine a display policy for an APP on the first device 100. Then the WMS may control, by using a display driver and a surface manager (surface manager) of an underlying display system, the APP to be displayed on the display screen 194 of the first device 100 according to the display policy.

The DMS may be configured to configure a display policy, in an application display (display) of the first device 100, for a window interface to be projected to the second device 200, so that the second device 200 displays a corresponding projected interface according to the display policy for the window interface in the display.

Figure 3:
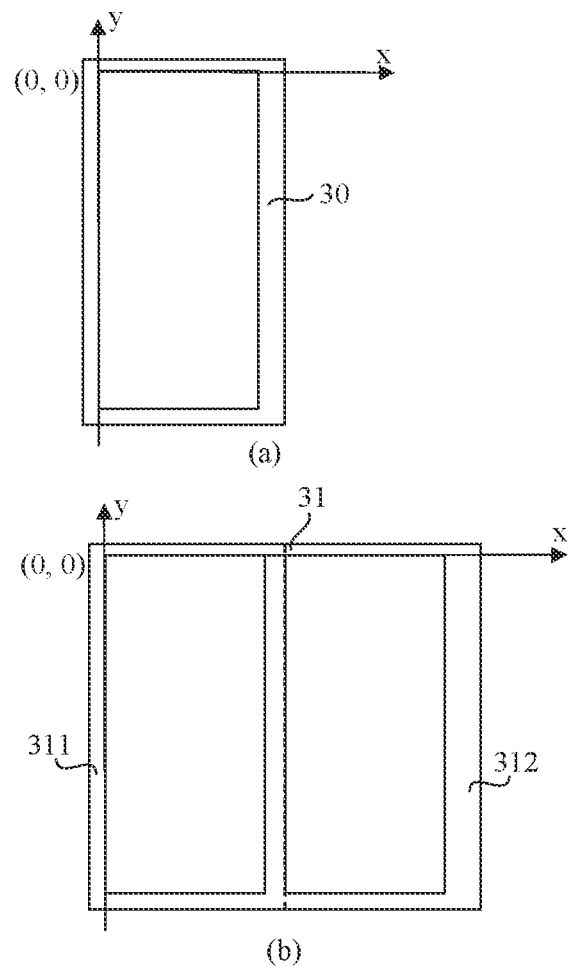
FIG. 3 is an example schematic plan view of an application display (display) according to an embodiment of this application.

The display is a display of an application running on the first device, or from a perspective of screen projection, may be understood as a display configured by the WMS for a to-be-projected window interface. The WMS may configure the display based on a size of an area occupied when the to-be-projected window interface is displayed in a tiled manner. As shown in FIG. 3, the WMS may configure the display by using an upper left corner of the first device 100 as an origin of a coordinate system and using a width of the display screen 194 of the first device 100 as a unit. For example, the WMS may perform extension in an x-axis direction to obtain the display. A size of the display is associated with a quantity of to-be-projected window interfaces. For example, in an embodiment shown in (a) in FIG. 3, in a scenario in which there is one to-be-projected window interface, a display of the display screen 194 can accommodate the to-be-projected window interface, and the WMS configures the display of the display screen 194 as a display 30. For another example, in an embodiment shown in (b) in FIG. 3, in a scenario in which there are two to-be-projected window interfaces, a display of the display screen 194 cannot accommodate the two window interfaces displayed in a tiled manner. Based on this, the WMS extends, in an x-axis direction, a display whose width is equal to a width of the display screen 194. Further, the WMS configures one to-be-projected window interface to be displayed in the display of the display screen 194, and the other to-be-projected window interface to be displayed in an extended area. To be specific, in the embodiment shown in (b) in FIG. 3, a display 31 includes a first display 311 and a second display 312. The first display 311 is configured on the display screen 194 of the first device 100 and is a display visible to a user. The second display 312 is an extended display of the first display 311 and is a display invisible to the user. In this embodiment of this application, the extended display is also referred to as a "virtual display (virtual display)". It should be understood that a size of the virtual display is associated with a quantity of to-be-projected window interfaces. For example, in a scenario in which there are three to-be-projected window interfaces, the WMS extends, in an x-axis direction, a display whose width is twice a width of the display screen 194. Correspondingly, a width of the virtual display is twice the width of the display screen 194.

The AMS may be configured to manage running processes of an APP. The running processes of the APP include startup, pausing, termination, and the like of an APP process. One APP usually includes a plurality of activities, and the AMS is specifically configured to manage different activities of the APP in different processes of the APP. For example, when a login interface of a mailbox APP runs, the AMS invokes an activity corresponding to the mailbox APP. In a process of displaying a main interface of the mailbox, the AMS invokes another activity corresponding to the mailbox APP.

The AMS may be further configured to: after an APP process is started, set a task identity (task identity, task ID) for the started APP, so that all activities of the APP correspond to the specified task ID. In this way, the first device 100 can distinguish between window interfaces, and the second device 200 can distinguish between projected interfaces. For example, the AMS may set a task ID for an APP based on a quantity of APPs running on the first device 10. For example, the AMS may set a task identity of a main interface of the first device 100 to a task 0. After a process of a mailbox APP on the first device 100 is started, the AMS sets a task identity "task 1" for the mailbox APP. In some other embodiments, the AMS may be further configured to: after an APP process is terminated, delete a task identity corresponding to a corresponding APP.

The WMS may be configured to manage a window program. For example, the WMS may obtain a size of a display screen, a size of a display, and a location and coordinates of each window interface. In addition, the WMS may further determine, through traversal, whether a current interface of a running APP includes a security flag bit (this is implemented by viewing a parameter of a window state). After determining, through traversal, that the current interface (Activity) of the APP includes a security flag bit, the first device 100 is triggered to send a security protection instruction to the second device 200, so that the second device 200 displays a security interface at the forefront of a projected interface for a window interface of the APP, and stops projecting, to the second device 200, a display in which the application is located. The security protection instruction includes, for example, a task identity of a corresponding window interface.

In some embodiments, the security flag bit may be implemented, for example, as a security flag (flag). In actual implementation, the security flag may include a plurality of types of flags, and different types of flags may indicate security requirement scenarios with different properties. For example, a first flag may indicate an application security lock. In an actual operation, when an application with a security lock receives a user operation and is started, a security mode of an application security lock is triggered. For example, the second flag may indicate that setting is automatically performed by an application. In some embodiments, in an implementation scenario of biometric recognition (for example, face-based unlocking), a display interface (for example, a photo of an identity card) including privacy information, or the like, a security mode in which setting is automatically performed by an application is triggered. In some other embodiments, some applications specify that the applications are currently in a specific activity and no screenshot or screen recording can be performed, thereby triggering a security mode in which setting is automatically performed by an application. The third flag may indicate that a security keyboard is invoked. In an actual operation, in an implementation scenario of entering a bank card account and/or a password, a security mode in which a security keyboard is invoked is triggered. It may be understood that, in some embodiments, a flag is associated with an activity, that is, one activity corresponds to one flag.

In some embodiments, determining whether a flag exists in this application may be understood as determining a value of the flag. For example, if the flag is 1, it is determined that the flag exists; or if the flag is 0, it is determined that the flag does not exist. For another example, if the flag is 0, it is determined that the flag exists; or if the flag is 1, it is determined that the flag does not exist. This is not limited in this application.

Based on the descriptions in the foregoing embodiments, a window interface may correspond to a plurality of activities. In a process of invoking an activity of a window interface, a window state of a corresponding APP is updated. In some embodiments, in an implementation process of updating a window state, the window state may be updated to the at least one of the foregoing flags. Based on this, the WMS may determine whether a window interface includes a security flag bit by determining, through traversal, whether a window state of the window interface includes a flag. If a window state corresponding to a corresponding activity includes any one of the foregoing flags, it indicates that a current window interface of the APP includes a security flag bit. In this case, the first device 100 sends a security protection instruction to the second device 200.

The content provider is configured to store and obtain data, and enable the data to be accessed by an application. The data may include a video, an image, an audio, calls that are made and answered, a browsing history and bookmarks, an address book, and the like.

The view system includes visual controls, such as a control for displaying a text and a control for displaying a picture. The view system may be configured to construct an application. A display interface may include one or more views. For example, a display interface includes a camera icon.

The phone manager is configured to provide a communication function for the first device 100, for example, management of a call status (including answering, hanging up, or the like).

The resource manager provides various resources such as a localized character string, an icon, an image, a layout file, and a video file for an application.

The notification manager enables an application to display notification information in a status bar, and may be configured to convey a notification message. The notification information may automatically disappear after a short pause without user interaction. For example, the notification manager is configured to notify download completion or give a message reminder. The notification manager may alternatively be a notification that appears in a top status bar of the system in a form of a graph or a scroll bar text, for example, a notification for an application running in the background, or may be a notification that appears on the screen in a form of a dialog window. For example, text information is prompted in the status bar, a prompt tone is played, the first device 100 vibrates, or an indicator blinks.

The Android runtime (Android Runtime) includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes Java files of the application layer and the application framework layer as binary files. The virtual machine is configured to perform functions such as object lifecycle management, stack management, thread management, security and exception management, and garbage collection.

Still refer to FIG. 2B. The system library, the kernel layer, and the like below the application framework layer may be referred to as an underlying system. The underlying system includes the underlying display system configured to provide a display service. For example, the underlying display system includes a display driver at the kernel layer and a surface manager in the system library.

The system library may include a plurality of functional modules, for example, a surface manager (surface manager), a media library (media library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playing and recording in a plurality of commonly used audio and video formats, static image files, and the like. The media library may support a plurality of audio and video encoding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The second device in embodiments of this application may be an electronic device including a wireless communication module and a display function, for example, a display device, a smart television, a tablet computer, a notebook computer, a UMPC, a netbook, or other electronic devices. It may be understood that a specific type of the second device is not limited in embodiments of this application. The second device may be a device on which iOS®, Android®, Microsoft®, or another operating system is installed.

Figure 2C:
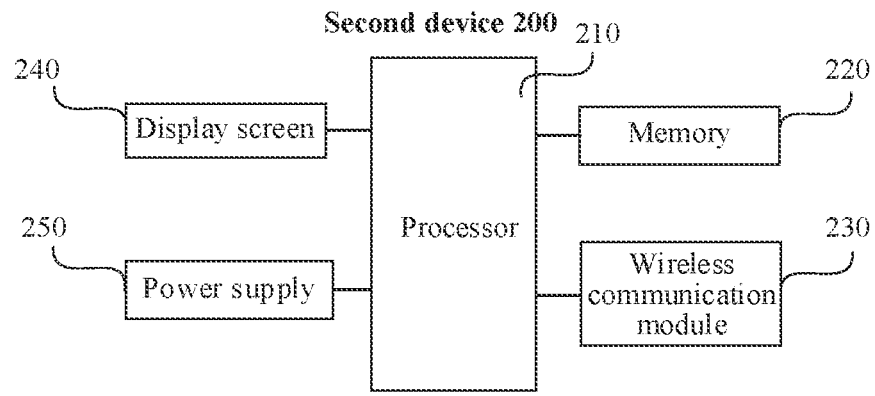
FIG. 2C is a schematic diagram of an example architecture of a second device 200 according to an embodiment of this application.

FIG. 2C is a schematic diagram of an example architecture of a second device 200. The second device 200 may include a processor 210, a memory 220, a wireless communication module 230, a display screen 240, a power supply 250, and the like.

It may be understood that the structure shown in this application does not constitute a specific limitation on the second device 200. In some other embodiments of this application, the second device 200 may include more or fewer components than those shown in the figure, or some components may be combined, or some components may be split, or there may be a different component layout. The components shown in the figure may be implemented by using hardware, software, or a combination of software and hardware.

In this embodiment, hardware and software included in the processor 210 and functions of the hardware and software are similar to those of the processor 110. Details are not described herein again in this application. The processor 210 may be configured to invoke the display screen 240 to display a projected interface, a security interface, and the like that come from the first device 100. In some embodiments, the processor 210 may be further configured to generate an operation instruction, where the operation instruction is used to instruct a user to perform an operation on an APP on a side of the first device 100.

A communication solution provided by the wireless communication module 230 is similar to that provided by the wireless communication module 160, and details are not described herein again. The communication solution provided by the wireless communication module 230 can enable the second device 200 to communicate with the first device 100, so that a function of video stream and instruction interaction is implemented between the second device 200 and the first device 100. For example, the wireless communication module 230 implements a function of receiving, by the second device 200, a to-be-projected video stream from the first device 100.

The memory 220 may be configured to store one or more computer programs, and the one or more computer programs include instructions. The processor 210 may run the instructions stored in the memory 220, so that the second device 200 performs a display method and the like provided in some embodiments of this application. The memory 220 may be further configured to cache data included in a process in which the second device 200 performs the display method, for example, data of a security interface.

The display screen 240 is configured to display a control, information, an image, a video, and the like of the second device 200, and projected interface information that comes from the first device 100. In some other embodiments, after receiving a security protection instruction from the first device 100, the second device 200 may trigger the display screen 240 to display a security interface at the forefront of a projected interface corresponding to the security protection instruction. In this embodiment, a hardware composition of the display screen 240 is similar to that of the display screen 194, and details are not described herein.

The power supply 240 may be configured to supply power to the processor 210, the memory 220, the display screen 240, and the like.

A UI used to implement a display function in embodiments of this application is a medium interface for interaction and information exchange between an application or an operating system and a user. The UI implements conversion between an internal form of information and a form acceptable to the user. A user interface of an application is source code written by using a specific computer language such as Java or extensible markup language (extensible markup language, XML). The interface source code is parsed and rendered on a terminal device, and is finally presented as content that can be identified by a user, for example, a control, for example, a picture, a text, or a button. The control (control), also referred to as a widget (widget), is a basic element on the user interface. Typical controls include a toolbar (toolbar), a menu bar (menu bar), a text box (text box), a button (button), a scrollbar (scrollbar), a picture, and a text. An attribute and content of a control on an interface are defined by using a tag or a node. For example, the control included in the interface is defined in the XML by using a node, for example, <Textview>, <ImgView>, or <VideoView>. One node corresponds to one control or one attribute on the interface. After being parsed and rendered, the node is presented as user-visible content. In addition, interfaces of many applications such as a hybrid application (hybrid application) usually further include a web page. A web page, also referred to as a page, may be understood as a special control embedded in an interface of an application. A web page is source code written by using a specific computer language such as hypertext markup language (hypertext markup language, HTML), cascading style sheets (cascading style sheets, CSS), or JavaScript (JavaScript, JS). The web page source code may be loaded and displayed, as content that can be identified by a user, by a browser or a web page display component with a function similar to that of the browser. Specific content included in the web page is also defined by using a tag or a node in the web page source code. For example, an element and an attribute of the web page are defined in the HTML by using <p>, <img>, <video>, or <canvas>.

The user interface is usually represented in a form of a graphical user interface (graphical user interface, GUI), and is a user interface that is related to a computer operation and that is displayed in a graphic manner. The user interface may be an interface element such as an icon, a window, or a control displayed on a display screen of an electronic device, and the control may include a visual interface element such as an icon, a button, a menu, a tab, a text box, a dialog box, a status bar, a navigation bar, or a widget.

It should be noted that, in a typical security protection mechanism based on a screen projection scenario, the first device 100 usually projects a screen to the second device 200 by using a display as a unit, and the second device 200 displays a security interface by using a window interface as a unit. Based on this, if a display projected by the first device 100 includes at least two window interfaces, the second device 200 may correspondingly display the at least two projected interfaces. When any one of the at least two window interfaces requires security protection, the second device 200 displays a security interface by using a window interface as a unit, so that the at least two projected interfaces all display a security interface or a black screen (in this case, display data of the first device is not transmitted to the second device). As a result, a user cannot perform a normal operation on a projected interface without a security requirement either, and therefore user experience is poor.

Figure 4A:
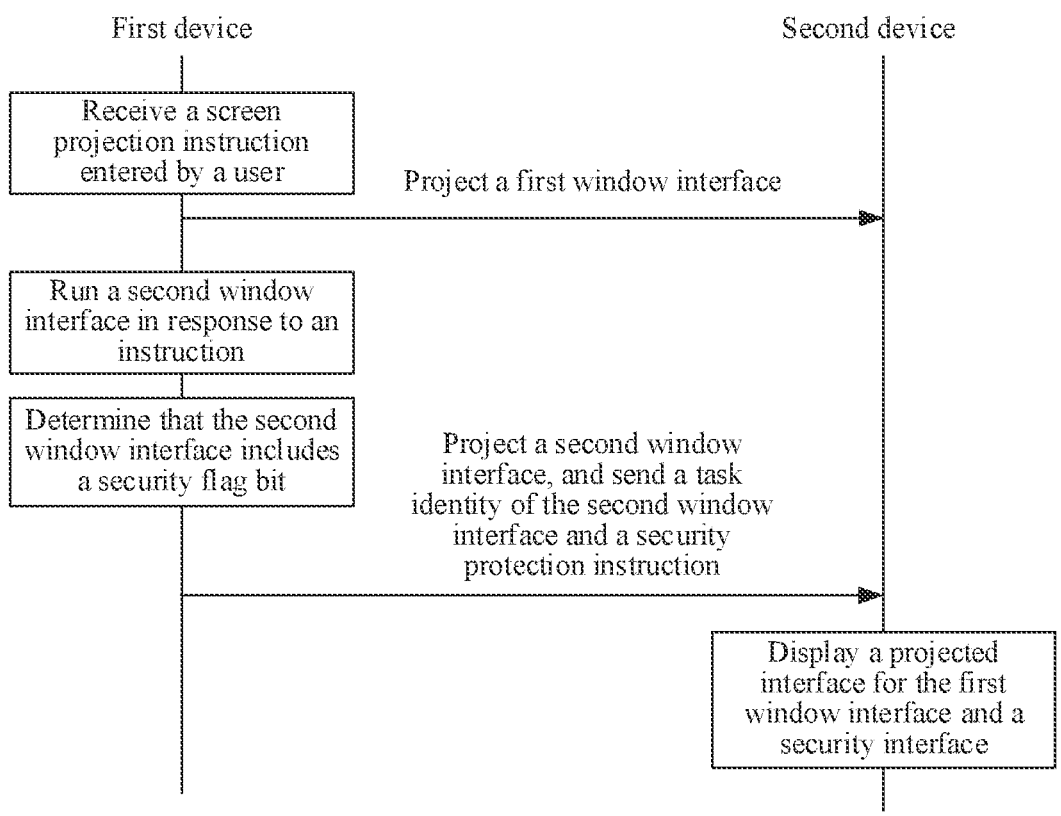
FIG. 4A is a schematic diagram of first example signaling interaction in a display method according to an embodiment of this application.

To resolve the foregoing problem, embodiments of this application provide a display method and an electronic device. As shown in FIG. 4A, a display method included in an embodiment of this application includes: A first device receives a screen projection instruction entered by a user. The first device projects a first window interface to a second device in response to the screen projection instruction, and correspondingly, the second device displays a projected interface for the first window interface. Further, after running a second window interface in response to an instruction, the first device projects the second window interface to the second device (the instruction comes from the second device, for example, when the first window interface is a main interface, the instruction is an operation of double-clicking/tapping to run an application). After traversing a window state, the first device determines that the second window interface includes a security flag bit, and sends a task identity of the second window and a security protection instruction. The second device displays a projected interface for the first window interface and a security interface (the security interface is displayed in replacement of the original second window interface).

That the first device traverses the window state may be periodically triggered, or may be triggered by a change of a location of an activity in a stack, or may be triggered by a change of an activity at the top of a stack.

Based on this, in the implementation scenario shown in FIG. 4A, after the first device starts the second window interface, a flag corresponding to an activity, of the second window interface, that is displayed on the second window interface in response to a startup instruction is 1. For example, the second window interface is a login interface of a bank APP, and a security keyboard is triggered after the second window is started. In this way, before screen projection, the first device immediately determines that the second window includes the security flag, and then the first device sends the task identity of the second window and the security protection instruction to the second device, so that the second device displays the projected interface for the first window interface and the security interface.

In some other embodiments, an embodiment of this application further provides another example display method. As shown in FIG. 4A, in this embodiment, a first device receives a screen projection instruction entered by a user. The first device projects a first window interface to a second device in response to the screen projection instruction. After running a second window interface in response to an instruction, the first device determines, in a first traversal period, that the second window interface does not include a security flag bit, and then projects the second window interface to the second device. Further, the first device detects, in a subsequent traversal period, that the second window interface includes a security flag bit, and then the first device sends a task identity of the second window interface and a security protection instruction to the second device. Correspondingly, the second device displays a projected interface for the first window interface and a security interface.

Figure 4B:
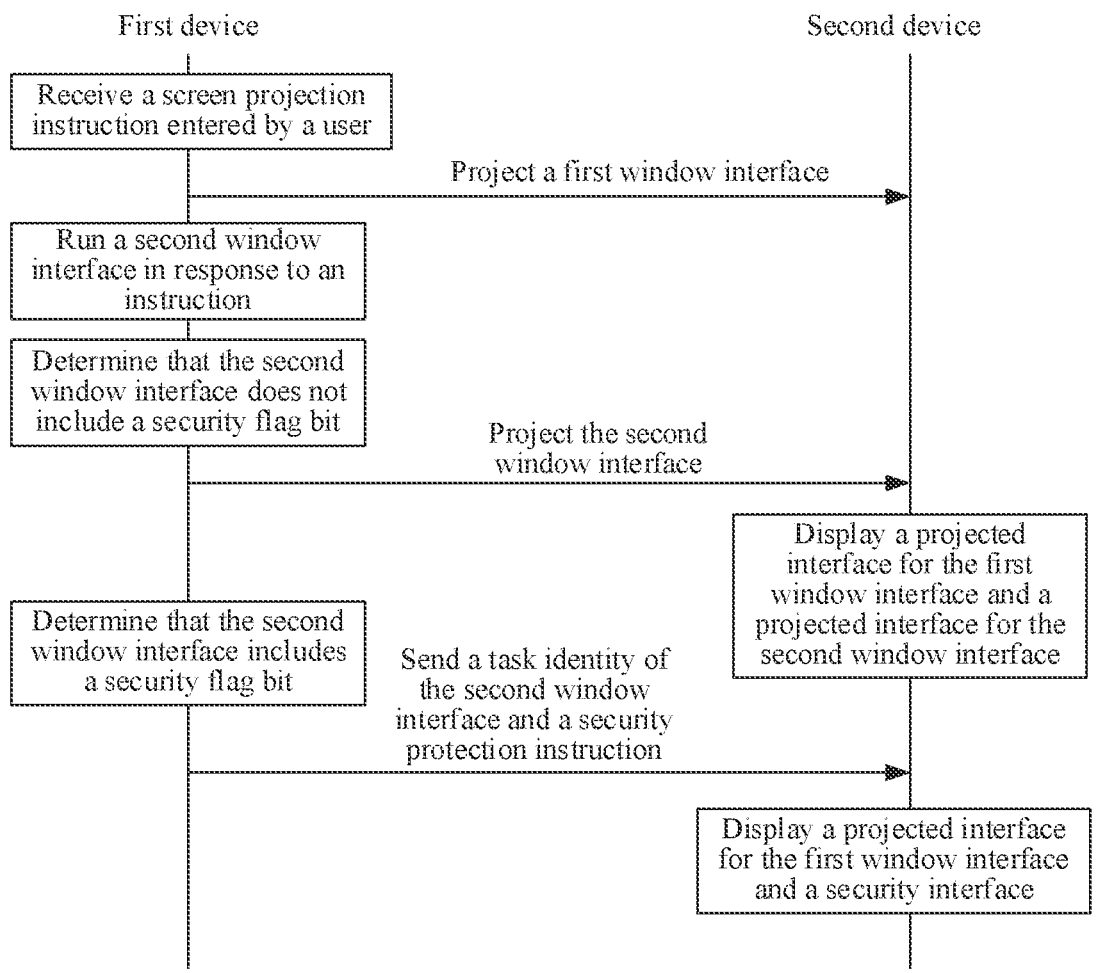
FIG. 4B is a schematic diagram of second example signaling interaction in a display method according to an embodiment of this application.

In the implementation scenario shown in FIG. 4B, after the first device starts the second window interface, content of the currently started second window interface has no security requirement, and correspondingly, a flag of a current window state of the second window interface is set to 0. In this case, the first device may project the content of the second window interface to the second device, so that the second device displays the projected interface for the first window interface and a projected interface for the second window interface. In response to triggering by a user, the second window interface changes, thereby triggering a change of an activity of a changed interface. Therefore, the changed second window interface has a security requirement, and a flag of a corresponding window state is set to 1. Further, the first device can determine that the second window interface in this case includes a security flag bit, and the first device triggers the second device to display the second window interface as a security interface, so that the second device displays the projected interface for the first window interface and the security interface.

For example, after the second window interface is started, a main interface of a wallet APP is displayed. A main interface of the wallet APP is, for example, a photo without a security requirement. In this case, the first device projects the wallet APP to the second device. The second device may display a projected interface for the main interface of the wallet APP. Further, in response to triggering by a user, the second window interface enters a payment interface of the wallet APP. In this case, the second window interface includes a payment password input control, and is an interface with a security requirement. After detecting the security flag bit, the first device sends the task identity of the second window interface (an interface of the wallet APP) and the security protection instruction to the second device, so that the second device displays the projected interface for the second window interface as a security interface.

Further, in the embodiment shown in FIG. 4A or FIG. 4B, if the second window interface further updates displayed content in response to an operation instruction of the user and the corresponding content has no security requirement, a flag of a corresponding window state is set to 0. In this case, in a process of periodically traversing the window state, the first device can determine, based on the window state, that the second window interface has no security flag bit, and then the first device may project an updated second window interface to the second device. Correspondingly, the second device hides the security interface, and displays an updated projected interface for the second window interface.

It can be learned from the foregoing descriptions of screen projection that content projected by the first device to the second device is a window interface included in a display of the first device, that is, the first window interface and the second window interface are window interfaces included in the display of the first device. It should be understood that, if the display of the first device further includes a third window interface, a fourth window interface, and the like, the first device should further detect whether the third window interface and the fourth window interface include a security flag bit, and then the first device sends screen projection information of the third window interface and the fourth window interface to the second device based on a detection result. Details are not described herein. In addition, in this embodiment of this application, the first device performs screen projection once each time the display of the first device is updated. An increase or a decrease in a quantity of window interfaces in the display or a change of any window interface is considered as an update of the display.

It should be noted that, that the first device projects a screen to the second device may be implemented as follows: After the first device establishes a network connection to the second device, the first device sends a to-be-displayed interface to the second device in a form of a video stream. Then the second device may split the video stream based on parameter information (for example, a size of a window interface, a location of a window interface, or relative locations of window interfaces) sent by the first device, and then separately display, in a form of a window, each interface projected by the first device. Based on this, in an implementation scenario of screen projection, a WMS configures a display used to display the to-be-projected window interface in a tiled manner, and an AMS adds a task ID to each to-be-projected window interface, so that the first device generates a video stream corresponding to each to-be-projected window interface, and identifies each to-be-projected window interface.

It should be noted that the display includes window interfaces of all APPs running on the first device, and the to-be-projected window interface may be all window interfaces in the display, or may be some window interfaces in the display.

In some implementations, before screen projection, the first device determines whether each window interface has a security requirement, and then the first device sends a task ID of each window interface and screen projection information of the window interface to the second device based on a detection result. The second device displays, based on the task ID, a security interface and a projected interface including content of the window interface, where the security interface is a projected interface for a window interface with a security requirement. In this way, the second device can securely display an interface with a security requirement, and it can also be ensured that the user performs a normal operation on an interface without a security requirement.

For ease of understanding, in the following embodiments of this application, a display method, in a screen projection scenario, that is provided in embodiments of this application is specifically described with reference to accompanying drawings by using a mobile phone with the structure shown in FIG. 2A and FIG. 2B and a notebook computer with the structure shown in FIG. 2C as examples.

In embodiments of this application, an actual implementation process may be divided into the following three stages: a screen projection function enabling stage, a display stage in a security requirement scenario, and a display stage after an operation is performed on a security interface. The following describes embodiments of the display method with reference to the three stages.

Figures 1, 5C:
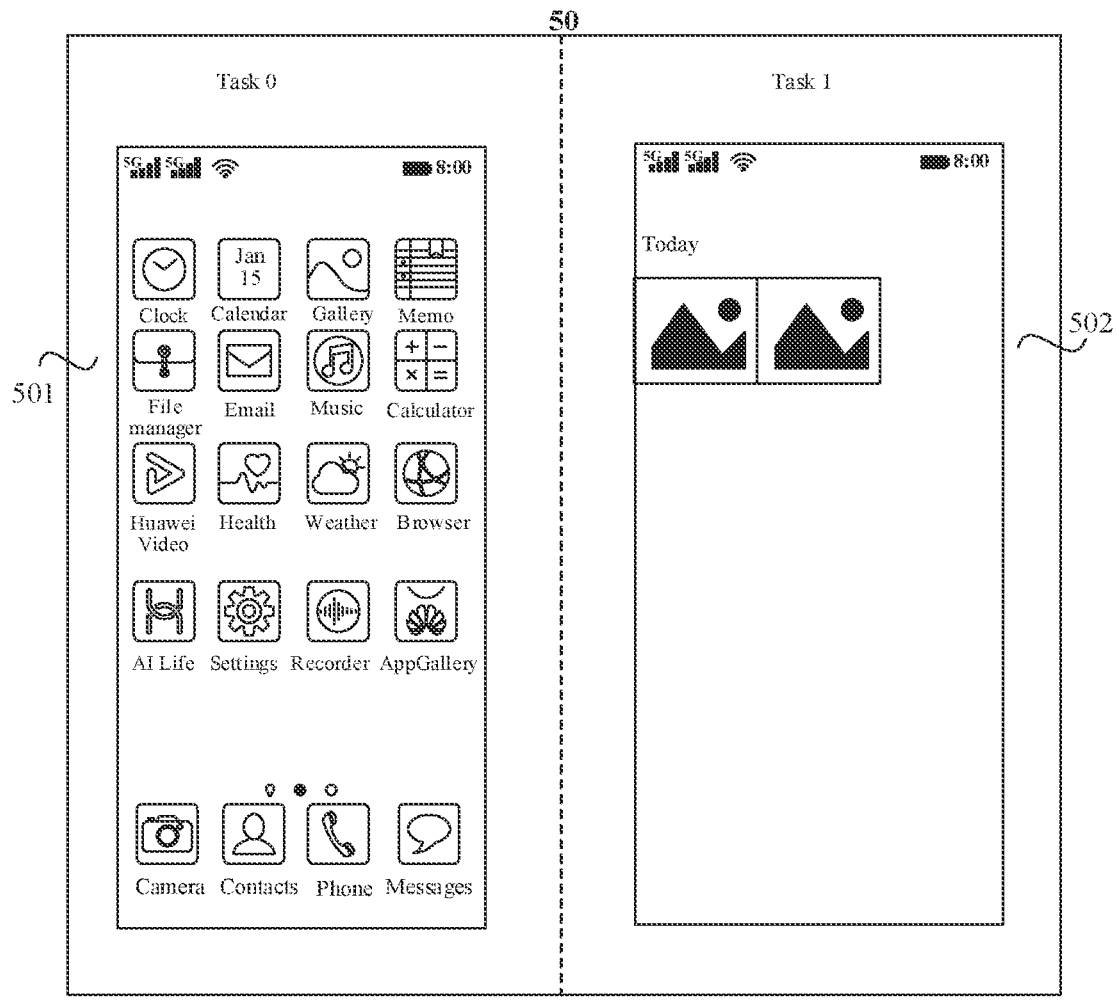

Screen projection function enabling stage:

In an embodiment of this application, a mobile phone and a notebook computer may establish a communication connection by using respective wireless communication modules. After receiving a screen projection function enabling instruction entered by a user, for example, the mobile phone may send, to the notebook computer based on a wireless fidelity direct (Wi-Fi Direct) technology, a video stream that needs to be projected, to implement a screen projection function. In some embodiments, for example, the mobile phone and the notebook computer may establish a communication connection by using respective NFC modules or Bluetooth modules. After an instruction entered by the user through clicking/tapping for enabling "multi-device collaboration" is received, a screen projection function of the mobile phone is enabled. In a scenario in which a distance between the mobile phone and the notebook computer is less than or equal to a communication transmission distance, the mobile phone projects a first group of window interfaces to the notebook computer. If the foregoing screen projection scenario requirement is met, it is considered that the mobile phone receives a screen projection instruction. Details are not described herein. Display interfaces related to the projection of the first group of window interfaces projected by the mobile phone to the notebook computer are shown in FIG. 5A(1) and FIG. 5A(2) to FIG. 5C-2.

It may be understood that the foregoing modules for establishing a communication connection between the mobile phone and the notebook computer and the interface for enabling the screen projection function of the mobile phone are all examples for description, and do not constitute a limitation on embodiments of this application. In some other embodiments, the mobile phone and the notebook computer may alternatively establish a connection based on another communication module. In addition, the interface for enabling the screen projection function of the mobile phone may vary depending on different mobile phone models and different operating system versions of mobile phones. This is not limited herein.

As shown in FIG. 5A(1) and FIG. 5A(2), a GUI 51 shown in FIG. 5A(1) and FIG. 5A(2) is a first example display interface on the notebook computer after the mobile phone projects a screen to the notebook computer. The GUI 51 includes a projected interface 510. The projected interface 510 is a projected interface for a desktop of the mobile phone, and includes images of interface elements on the desktop of the mobile phone, for example, a gallery, a mailbox, and a wallet.

In an embodiment corresponding to FIG. 5A(1) and FIG. 5A(2), during reception of a screen projection instruction, the mobile phone invokes a wireless communication module to send a video stream of the desktop of the mobile phone to the notebook computer, regardless of an interface being displayed on a display screen of the mobile phone and regardless of an APP running in the foreground of the mobile phone. Further, the notebook computer decodes the corresponding video stream, and displays the projected interface 510 corresponding to the video stream. In this case, optionally, all APPs running on the mobile phone run in a form of a free floating window.

In some embodiments, an aspect ratio of a projected interface may be the same as an aspect ratio of a window interface. A size of the projected interface depends on a size of a screen of a second device. For example, the size of the screen of the second device is 285.7 millimeters in width (mm)×214.3 mm in height, and the size of the projected interface may be 110 mm in width×210 mm in height; or the size of the screen of the second device is 1456.4 mm in width×850.9 mm in height, and the size of the projected interface may be 450 mm in width×800 mm in height.

As shown in FIG. 5B(1) and FIG. 5B(2), a GUI 52 shown in FIG. 5B(1) and FIG. 5B(2) is an example display interface on the mobile phone during screen projection by the mobile phone, and a GUI 53 shown in FIG. 5B(1) and FIG. 5B(2) is a second example display interface on the notebook computer after the mobile phone projects a screen to the notebook computer. For example, the GUI 52 is a display interface of a gallery APP running on the mobile phone, and the GUI 52 includes an image 521 and an image 522. The GUI 53 includes a projected interface 530. The projected interface 530 is a projected interface for the GUI 52. The projected interface 530 includes a projected image 531 for the image 521 and a projected image 532 for the image 532.

In an embodiment corresponding to FIG. 5B(1) and FIG. 5B(2), during reception of a screen projection instruction, the mobile phone is displaying a window interface. Further, a WMS determines, through traversal, whether an activity corresponding to the window interface includes a flag. If the activity corresponding to the window interface does not include a flag, a GPU of the mobile phone may render a video stream of an interface currently displayed on the mobile phone. Then the mobile phone invokes the wireless communication module to send, to the notebook computer, the video stream of the interface being displayed on the mobile phone. Further, the notebook computer decodes the corresponding video stream, and displays the projected interface 530 corresponding to the video stream.

In some other embodiments, if the activity corresponding to the window interface includes a flag, the mobile phone may project a desktop of the mobile phone to the notebook computer. Correspondingly, a GUI of the notebook computer may be shown as the GUI 51. After the mobile phone receives an operation performed by a user and the mobile phone updates the window interface, the mobile phone may project an updated window interface to the notebook computer. For details, refer to descriptions of the following related embodiments, and details are not described herein.

In some other embodiments, if the mobile phone is not displaying an interface of any APP, the mobile phone projects the desktop of the mobile phone to the notebook computer. Correspondingly, a GUI of the notebook computer may be shown as the GUI 51.

As shown in FIG. 5C(1) and FIG. 5C(2), a GUI 54 shown in FIG. 5C(1) and FIG. 5C(2) is another example display interface of the mobile phone during screen projection by the mobile phone, and a GUI 55 shown in FIG. 5C(1) and FIG. 5C(2) is a third example display interface of the notebook computer after the mobile phone projects a screen to the notebook computer. For example, the GUI 54 is a display interface for a window interface that is running on the mobile phone and that has a security requirement. For details about an example display interface for the GUI 54, refer to FIG. 5C-2. Details are not described herein. The GUI 55 includes a projected interface 551 and a projected interface 552. The projected interface 551 is a projected interface for a window interface that is running on the mobile phone and that has no security requirement, and the projected interface 552 is a projected interface for the desktop of the mobile phone.

In an embodiment corresponding to FIG. 5C(1) and FIG. 5C(2), during reception of a screen projection instruction, for example, the mobile phone is running several APPs. In this embodiment, the mobile phone may separately detect whether each window interface running in the several APPs includes a security flag bit. Then the mobile phone may project a window interface that does not include a security flag bit and the desktop of the mobile phone to the notebook computer, and display, on the display screen of the mobile phone in a stacked manner (as shown in the GUI 54 in FIG. 5C(1) and FIG. 5C(2)), window interfaces that include a security flag bit, so that the user performs a next operation. The notebook computer displays a projected interface (as shown in the GUI 55 in FIG. 5C(1) and FIG. 5C(2)) for a window interface without a security requirement.

For example, during reception of a screen projection instruction, the mobile phone is running three APPs: a mailbox, a wallet, and a gallery. For example, a current window interface of the mailbox is a login interface, and a current window interface of the wallet is a bank card management interface. Further, the WMS traverses activities corresponding to the three window interfaces, to determine whether each activity includes a flag. For example, the WMS determines that an activity corresponding to the current window interface of the mailbox includes a first flag, an activity corresponding to the current window interface of the wallet includes a second flag, and an activity corresponding to the current window interface of the gallery does not include a flag. Then the WMS may report a traversal result to a DMS. The DMS configures a display of the mobile phone and a display policy for each window based on the traversal result. A display interface of the display is shown in FIG. 5C-1.

As shown in FIG. 5C-1, a display 50 shown in FIG. 5C-1 includes a display 501 and a display 502. The display 501 is deployed on the display screen of the mobile phone, and is a display visible to the user. The display 502 is an extended display of the display 501, and is a virtual display invisible to the user. In this embodiment, the desktop of the mobile phone and the window interface of the gallery have no security requirement. Therefore, the mobile phone may project the desktop and the window interface of the gallery to the notebook computer. Based on this, an AMS may configure a task ID for each of the desktop of the mobile phone and the window interface of the gallery. For example, the AMS configures a task 0 for the desktop of the mobile phone, and the AMS configures a task 1 for the window interface of the gallery. In addition, the DMS may configure the desktop of the mobile phone to be displayed in the display 501, and configure the window interface of the gallery to be displayed in the display 502. Further, the GPU of the mobile phone may render a video stream of the desktop of the mobile phone and a video stream of the window interface of the gallery. Then the mobile phone invokes the wireless communication module to send the task 0, the video stream of the desktop of the mobile phone, the task 1, and the video stream of the window interface of the gallery to the notebook computer. Further, the notebook computer decodes the corresponding video streams, splits an image obtained through decoding, and then displays the GUI 55 in FIG. 5C(1) and FIG. 5C(2). The projected interface 551 in the GUI 55 is, for example, a projected interface for the desktop of the mobile phone, and the projected interface 551 corresponds to the task 0. The projected interface 552 is, for example, a projected interface for the window interface of the gallery, and the projected interface 552 corresponds to the task 1.

Further, the window interface of the mailbox and the window interface of the wallet are interfaces with a security requirement. Even if the two window interfaces are projected to the notebook computer, the notebook computer is not allowed to display content of the two window interfaces. Based on this, the mobile phone may not project the two window interfaces to the notebook computer, but display the two window interfaces on the display screen of the mobile phone. The DMS may configure a display policy for the two window interfaces on the display screen of the mobile phone based on a traversal result of the WMS. Then the DMS may control, by using a display driver and a surface manager, the two window interfaces to be displayed on the display screen of the mobile phone. A display interface for the two window interfaces is shown in FIG. 5C-2.

Figures 2, 5C:
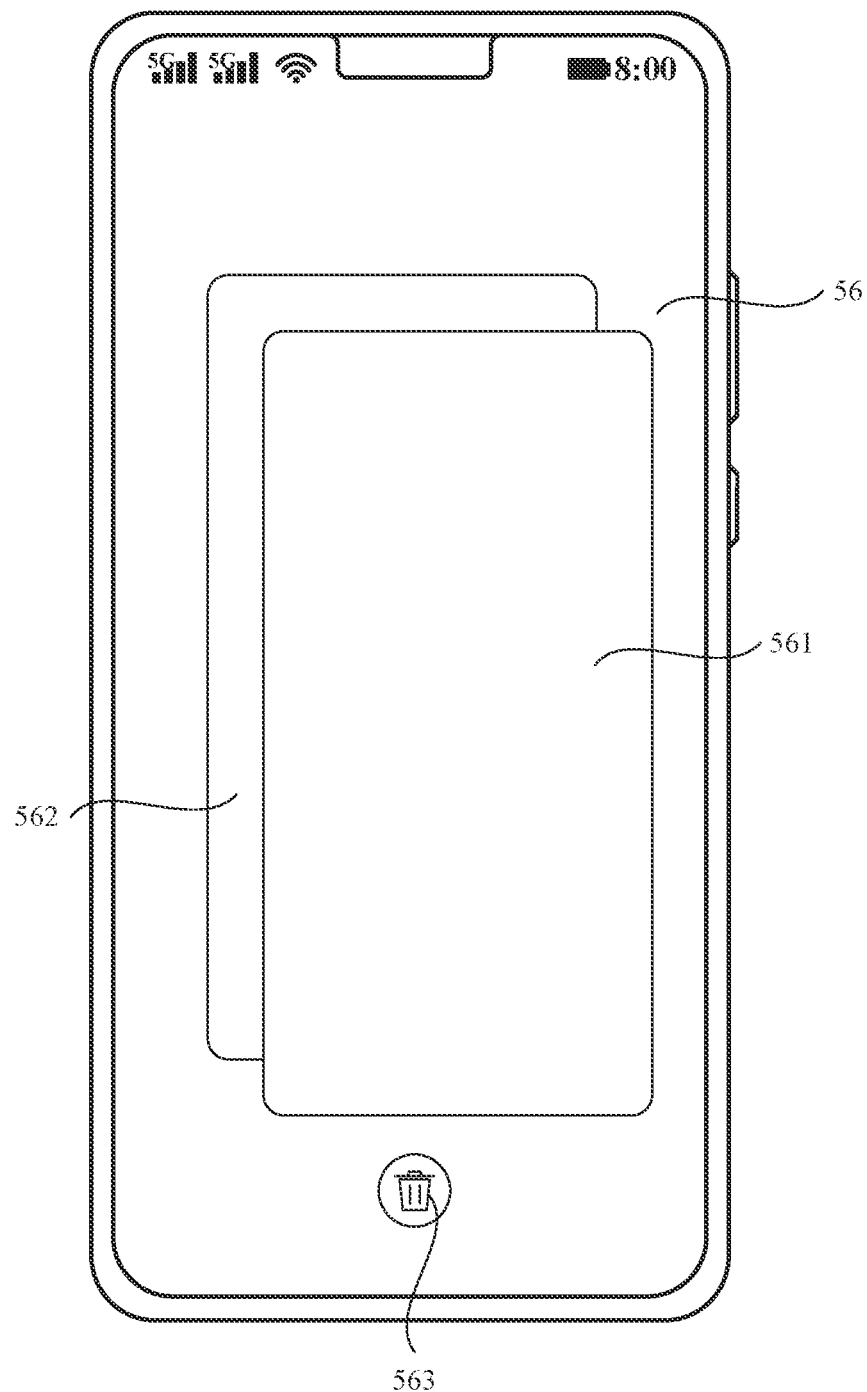

A GUI 56 shown in FIG. 5C-2 is an example display interface for the GUI 54. The GUI 56 is a display interface for an image of a window interface 561 and an image of a window interface 562. The image of the window interface 561 and the image of the window interface 562 are displayed in a stacked manner, and a delete icon 563 and the like are further included at the bottom of the GUI 56. For example, the window interface 561 is the login interface of the mailbox, and the window interface 561 is the bank card management interface of the wallet. After receiving an instruction entered by the user by tapping the delete icon 563, the AMS ends a process of the mailbox and a process of the wallet. After receiving an instruction entered by the user by tapping the image of the window interface 561, the DMS controls the login interface of the mailbox to be displayed at the forefront of the display screen of the mobile phone, so that the user can enter an account and a password for the mailbox. Similarly, after receiving an instruction entered by the user by tapping the image of the window interface 562, the DMS controls the bank card management interface of the wallet to be displayed at the forefront of the display screen of the mobile phone, so that the user can perform a next operation, for example, a payment operation. Details are not described herein.

In some embodiments, the mobile phone may display the GUI 56 after projecting the display 50 shown in FIG. 5C-1 to the notebook computer.

Further, after the mobile phone projects the display 50 to the notebook computer, that the mobile phone displays the GUI 56 and performs other subsequent display has triggered an update of a window interface. Correspondingly, the display 50 is triggered to be updated to another display. Then the WMS determines, through traversal, whether a window interface in an updated display includes a security flag bit. Further, the mobile phone may project the updated display based on a detection result.

In this implementation, after the mobile phone receives a screen projection instruction, regardless of whether a window interface of a currently running APP has a security requirement, the mobile phone selects a group of interfaces without a security requirement as a first group of window interfaces to be projected to the notebook computer. In this way, at least one operable interface can be projected to the notebook computer, so that the user can continue to perform an operation. In addition, security of a window interface with a security requirement can be ensured, and transmission resources can be saved.

It should be noted that, in some possible implementation solutions, the mobile phone may send a security interface to the notebook computer in this stage. Correspondingly, the notebook computer may locally store the security interface, and after receiving a security protection instruction from the mobile phone, display, as the security interface, a projected interface indicated by the security protection instruction.

Figure 6:
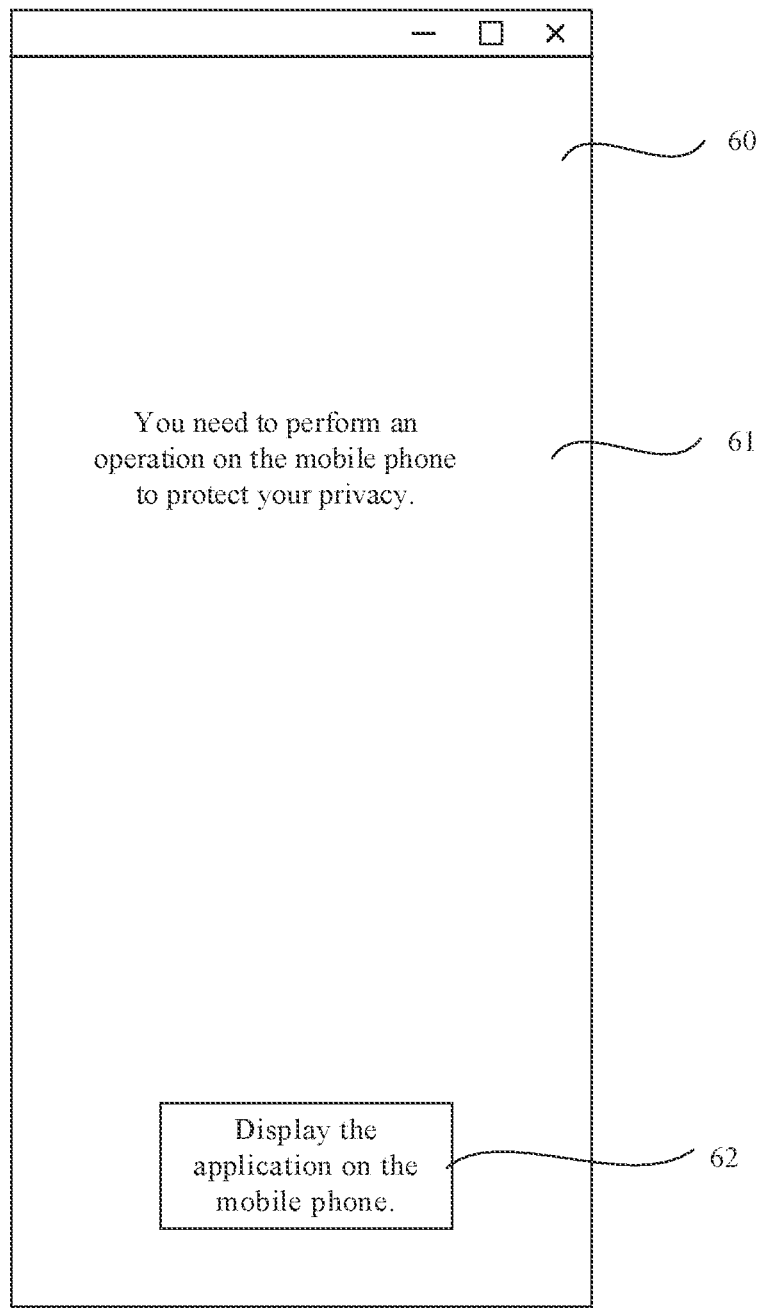
FIG. 6 is an example schematic diagram of a security interface according to an embodiment of this application.

FIG. 6 shows a security interface 60. The security interface 60 includes an icon 61 and an icon 62. The icon 61 displays, for example, the following information: "You need to perform an operation on the mobile phone to protect your privacy." The icon 62 displays, for example, the following information: "Display the application on the mobile phone." Optionally, the icon 62 receives a click performed by the user on the computer, and sends the click to the mobile phone side by using, for example, a Miracst UIBC (user input back control, user input back control) protocol. A background color of the security interface 60 may be a pure color, for example, black. In some other embodiments, to optimize visual experience of the user, a background of the security interface 60 may be a Gaussian-blurred wallpaper of the mobile phone.

In some implementation solutions, optionally, the background of the security interface is generated by the computer side. In some implementation solutions, to better ensure consistency of user experience on the mobile phone and the computer, optionally, the security interface is generated by the mobile phone side. For example, the mobile phone performs Gaussian blur processing on a wallpaper of the mobile phone, and then sends a processed wallpaper to the computer, and the computer stores the processed wallpaper. When receiving security interface display sent by the mobile phone, the computer locally reads the wallpaper and displays the wallpaper. It may be understood that, when the mobile phone side detects that the wallpaper of the mobile phone is changed, the mobile phone performs the foregoing operations, so that backgrounds of the computer side and the security interface can be consistent with the wallpaper on the mobile phone side.

It may be understood that FIG. 6 is merely an example for description and does not constitute a limitation on embodiment of this application. In some other embodiments, the security interface may alternatively include other information. In addition, information included in the security interface may be flexibly set. Details are not described herein.

Display stage in which an interface with a security requirement appears.

After the mobile phone projects the first group of window interfaces to the notebook computer, if the user continues to perform an operation on the mobile phone side or continues to perform an operation on the notebook computer side, an interface with a security requirement may be triggered to be displayed. The following describes embodiments of displaying a security interface from perspectives of two scenarios: The user triggers the mobile phone, and the user triggers the notebook computer.

Scenario 1: The User Performs an Operation on the Notebook Computer Side.

Figure 7A:
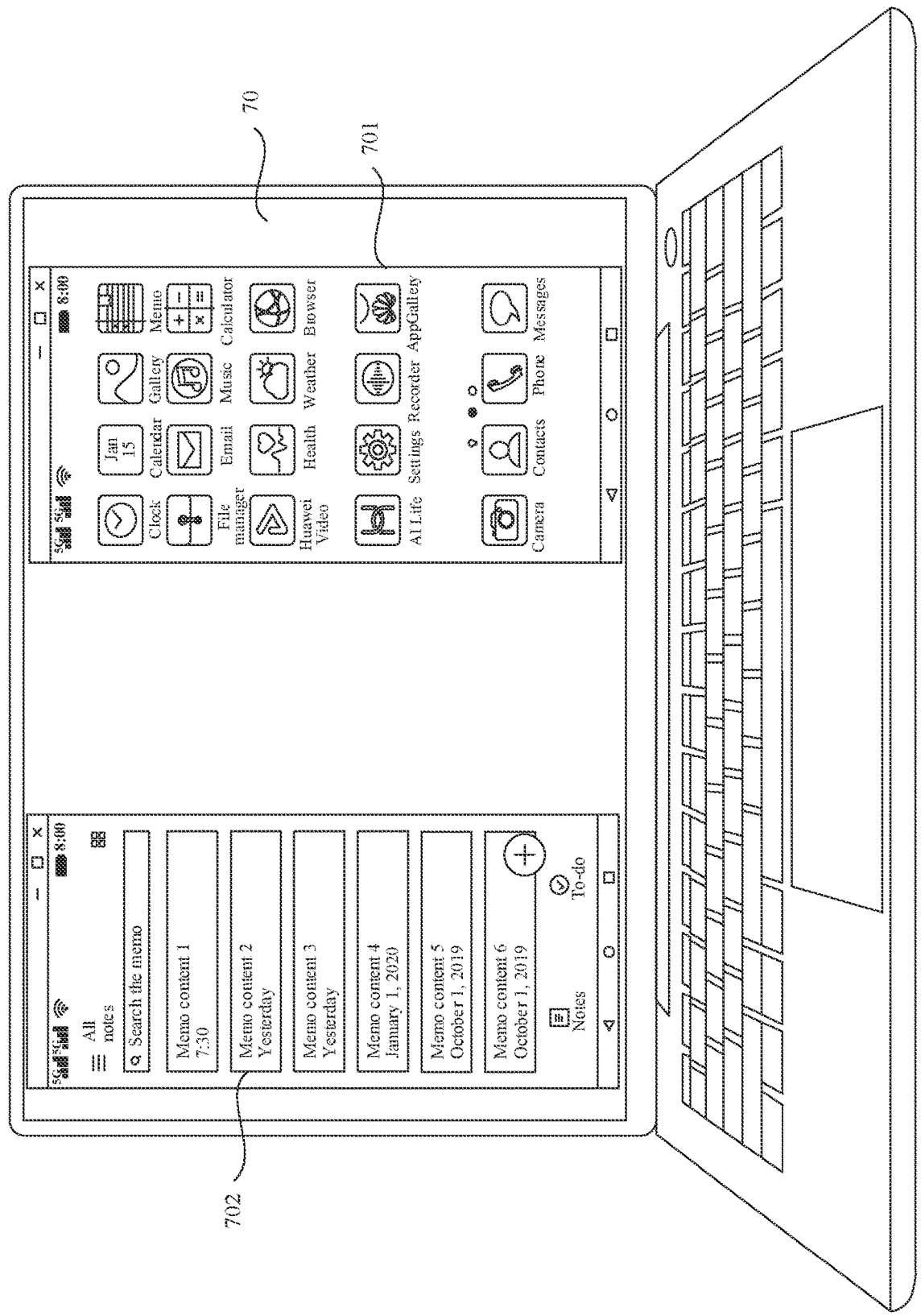
FIG. 7(a) and FIG. 7(b) are an example schematic diagram of a first group of projected interfaces according to an embodiment of this application.
Figure 7B:
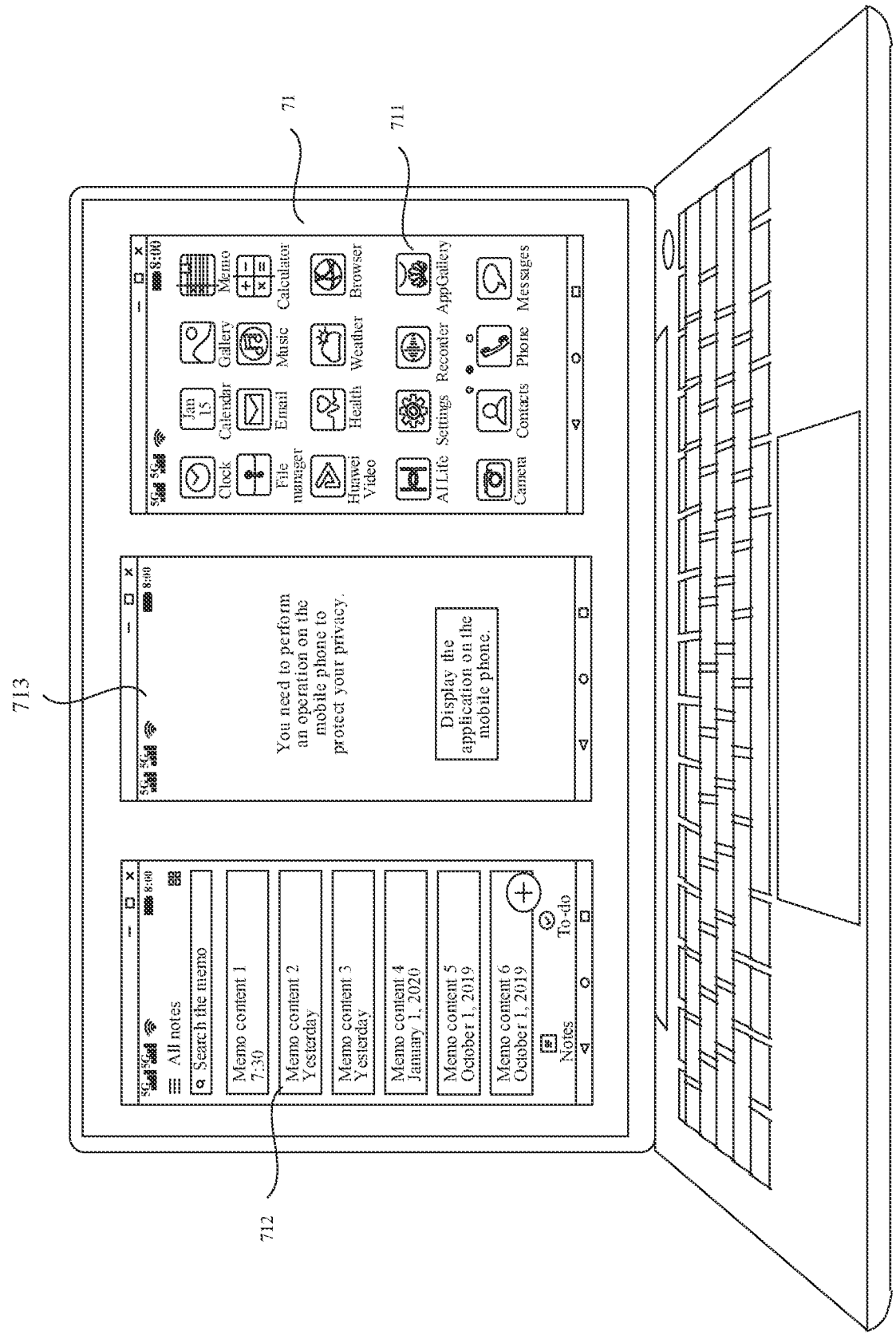
Figure 8A:
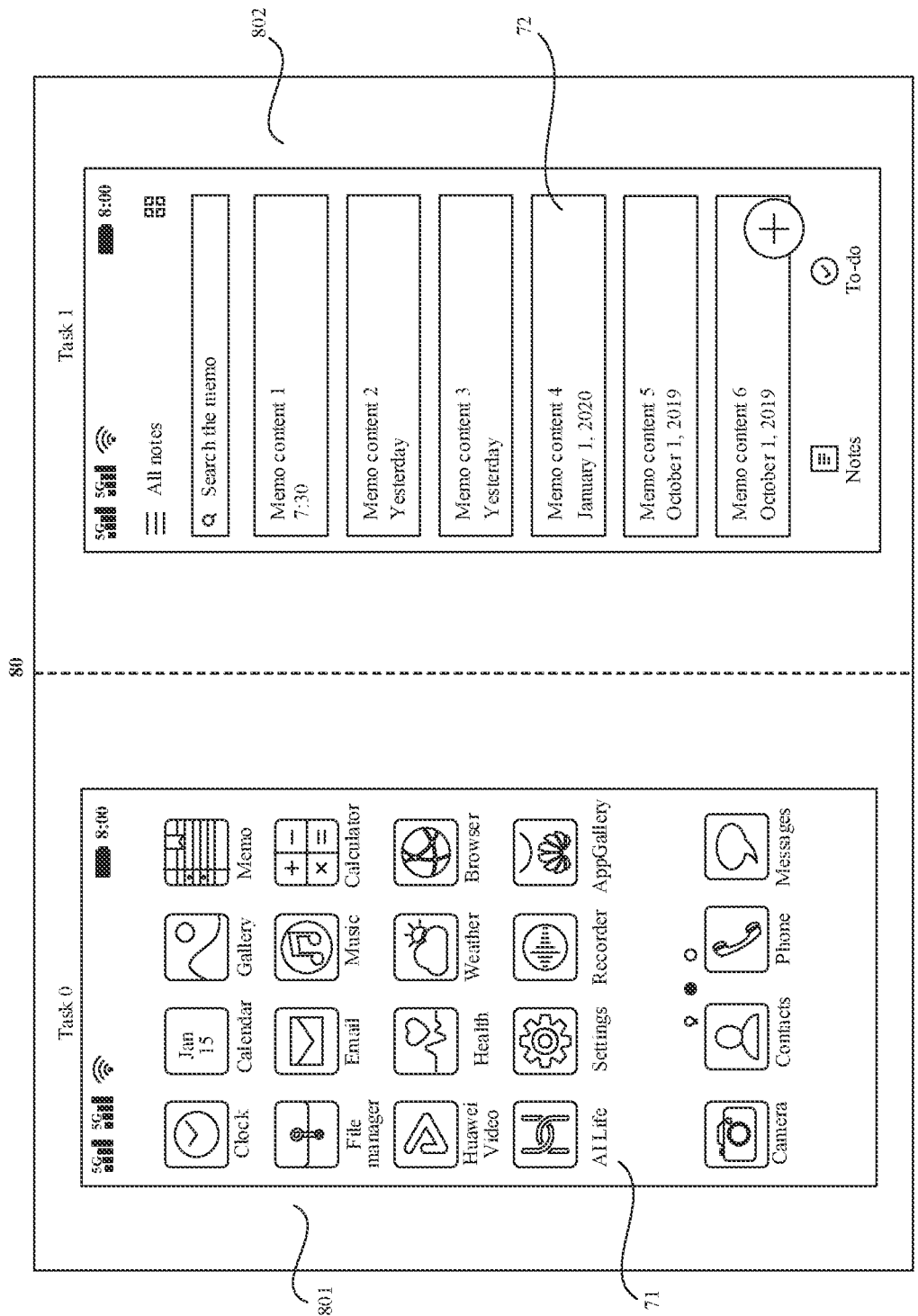
FIG. 8(a) and FIG. 8(b) are an example schematic diagram of a display corresponding to a display interface in FIG. 7(a) and FIG. 7(b) according to an embodiment of this application.
Figure 8B:
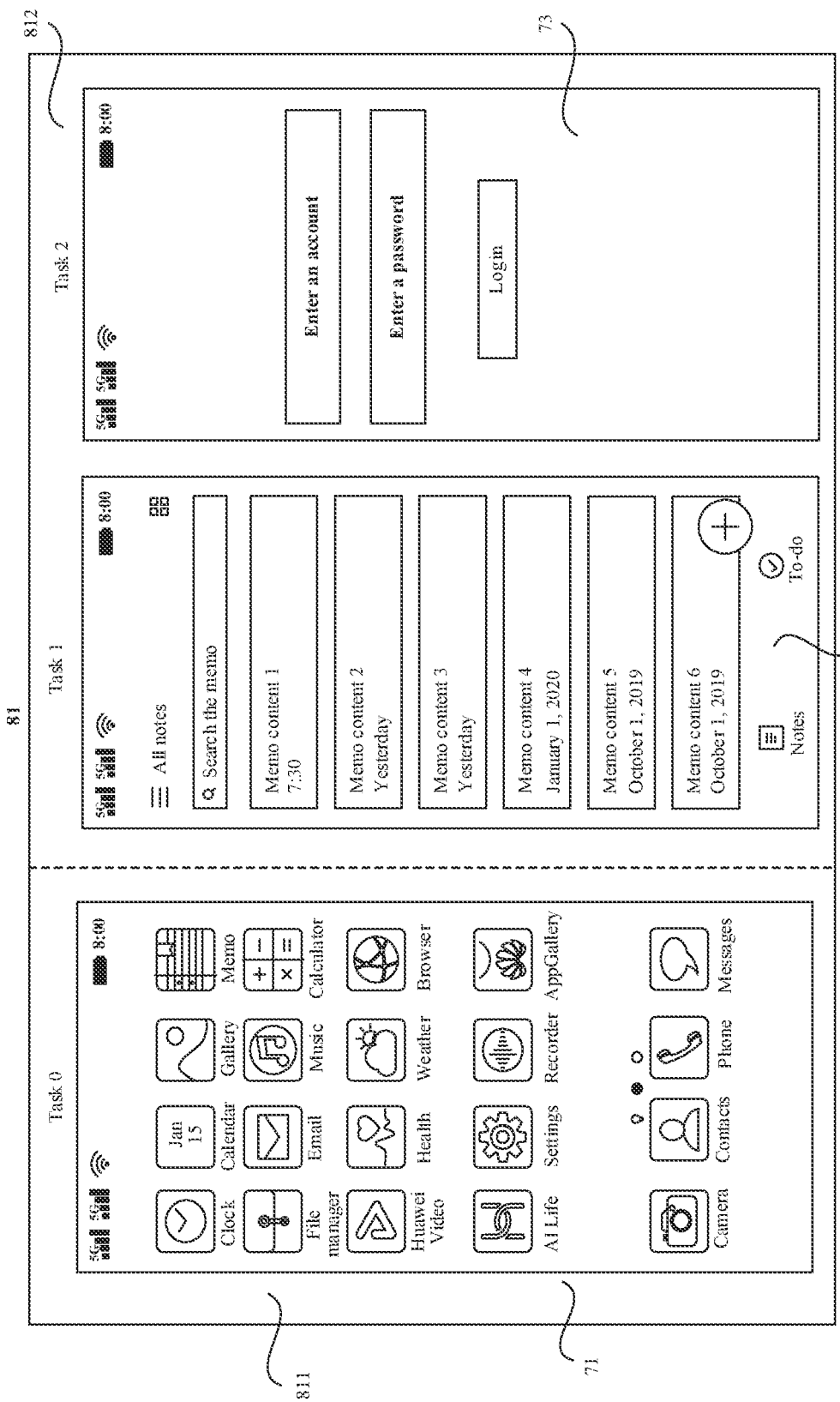

In this embodiment of this application, after the notebook computer receives an instruction entered by the user by clicking a projected interface, the notebook computer may generate a first operation instruction, where the first operation instruction is associated with a first APP. The first APP is an APP indicated by an image clicked by the user. Then the notebook computer sends the first operation instruction to the mobile phone based on the Wi-Fi Direct technology. The mobile phone performs an operation on the first APP in response to the first operation instruction, to trigger a change of a window interface displayed in the first APP, so that a display of the mobile phone is updated. Further, the mobile phone performs, based on an updated display, operations of detecting a security flag bit and re-projecting a screen, so that the notebook computer displays a projected interface for an APP triggered by the user, to implement a function of performing, by the user, an operation on the APP of the mobile phone based on the projected interface. FIG. 7(a) and FIG. 7(b) show an example display method in the scenario 1. FIG. 8(a) and FIG. 8(b) show a schematic change process of a display on the mobile phone side along with an implementation process shown in FIG. 7(a) and FIG. 7(b).

Figure 12:
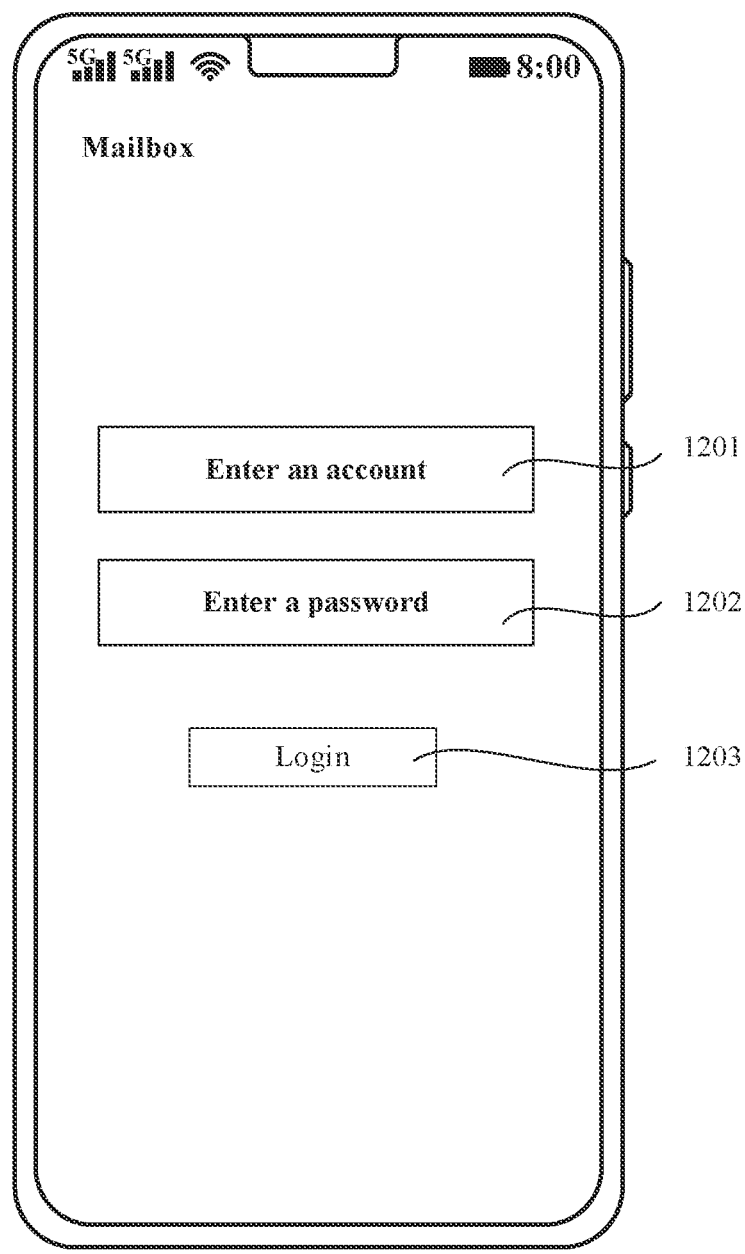
FIG. 12 is an example schematic diagram of a mailbox login interface according to an embodiment of this application.

As shown in FIG. 7(a), a GUI 70 is a display interface on the notebook computer after the mobile phone projects a display 80 shown in FIG. 8(a) to the notebook computer. The GUI 70 includes a projected interface 701 and a projected interface 702. The projected interface 701 is, for example, a projected interface for the desktop of the mobile phone, and includes images of APPs such as a mailbox and a memo. The projected interface 702 is, for example, a projected interface for a window interface of the memo. The projected interface 701 corresponds to an identifier task 0, and the projected interface 702 corresponds to an identifier task 1. After receiving an instruction entered by the user by clicking the mailbox, the notebook computer generates a first operation instruction, where the first operation instruction is used to trigger the mobile phone to run a mailbox APP (an example of the foregoing first APP). Then the notebook computer sends the first operation instruction to the mobile phone. The mobile phone runs the mailbox APP in response to the first operation instruction, to start a login interface of the mailbox. The login interface of the mailbox is shown in FIG. 12, and details are not described herein. Further, the display 80 on the mobile phone side is updated to a display 81 shown in FIG. 8(b). Then the mobile phone projects the display 81 to the notebook computer, so that the GUI 70 on the notebook computer is updated to a GUI 71 shown in FIG. 7(b).

After receiving a click operation performed by the user, the notebook computer may identify a first APP identifier corresponding to an image clicked by the user, where the first APP identifier is used to indicate the first APP. Then the notebook computer generates a first operation instruction, where the first operation instruction includes the first APP identifier. Further, the mobile phone may determine the first APP based on the first APP identifier. The first APP identifier may be, for example, a name of the first APP.

The GUI 71 shown in FIG. 7(b) is a display interface on the notebook computer after the mobile phone projects the display 81 shown in FIG. 8(b) to the notebook computer. The GUI 71 includes a projected interface 711, a projected interface 712, and a projected interface 713. The projected interface 711 corresponds to an identifier task 0, the projected interface 712 corresponds to an identifier task 1, and the projected interface 713 corresponds to an identifier task 2. The projected interface 711 is, for example, a projected interface for the desktop of the mobile phone desktop, and the projected interface 711 is the same as the projected interface 701 in the GUI 70. The projected interface 712 is, for example, a projected interface for a window interface of the memo, and the projected interface 712 is the same as the projected interface 702 in the GUI 70. The projected interface 713 is, for example, a projected interface for a window interface of the mailbox, and the projected interface 713 is the security interface shown in FIG. 6. Details are not described herein.

As shown in FIG. 8(a), the display 80 includes a window interface 71 and a window interface 72. The window interface 71 is the desktop of the mobile phone, and is projected to obtain the projected interface 701 in the GUI 70. The window interface 72 is a window interface of the memo, and is projected to obtain the projected interface 702 in the GUI 70. Because the window interface 71 and the window interface 72 are displayed, the WMS extends a virtual display by using a width of the display screen of the mobile phone as a unit, so that the display 80 includes a display 801 and a display 802. The display 801 is a display corresponding to the display screen of the mobile phone, the display 802 is a virtual display, and a width of the display 802 may be the same as a width of the display 801. Further, the WMS deploys the window interface 71 in the display 801 for display, and deploys the window interface 72 in the display 802 for display. In addition, for ease of identifying the window interface 71 and the window interface 72, the AMS sets an identifier task 0 for the window interface 71, and sets an identifier task 1 for the window interface 72. Further, in this embodiment, after determining that neither the window interface 71 nor the window interface 72 has a security requirement, the mobile phone sends the task 0, the task 1, and video streams of the window interface 71 and the window interface 72 to the notebook computer, so that the notebook computer displays the GUI 70.

Further, after the mobile phone starts and displays the login interface of the mailbox in response to the first operation instruction, a window interface is added to the display of the mobile phone based on the display 80, and the display 80 is updated to the display 81.

As shown in FIG. 8(b), the display 81 is a schematic display interface of the GUI 71 obtained through screen projection. The display 81 includes a window interface 71, a window interface 72, and a window interface 73. The window interface 71 is projected to obtain the projected interface 711 in the GUI 71. The window interface 72 is projected to obtain the projected interface 712 in the GUI 71. The window interface 73 is projected to obtain the projected interface 713 in the GUI 71. In this embodiment, to accommodate the window interface 71, the window interface 72, and the window interface 73, the DMS extends a virtual display based on the display screen of the mobile phone, to obtain the display 81. The display 81 includes a display 811 and a display 812. The display 811 is the display screen of the mobile phone, the display 812 is a virtual display, and a width of the display 812 may be twice a width of the display 811. Further, the WMS deploys the window interface 71 in the display 811 for display, sets an identifier task 0 for the window interface 71, deploys the window interface 72 and the window interface 73 in the display 812 for tiled display, sets an identifier task 1 for the window interface 72, and sets an identifier task 2 for the window interface 73.

In some embodiments, the display 81 may be obtained by the mobile phone by continuing to perform on operation on the display 80.

Further, the WMS of the mobile phone traverses an activity of the window interface 71, an activity of the window interface 72, and an activity of the window interface 73, to determine whether each activity includes a flag (this may be understood as determining whether a flag is set). For example, the WMS determines that neither the activity of the window interface 71 nor the activity of the window interface 72 includes a flag, and the activity of the window interface 73 includes a first flag. Then the mobile phone sends the task 0, the task 1, the task 2, video streams of the window interface 71 and the window interface 72, and a security protection instruction to the notebook computer. A video stream of the window interface 71 corresponds to the task 0, a video stream of the window interface 72 corresponds to the task 1, and the security protection instruction corresponds to the task 2. Further, the notebook computer splits the video streams of the window interface 71 and the window interface 72, and displays the projected interface 711 and the projected interface 712. In addition, the notebook computer displays a projected interface for the window interface 73 as a security interface in response to the security protection instruction, to obtain the projected interface 713.

In some embodiments, after the mobile phone projects the first group of window interfaces to the notebook computer, the display screen of the mobile phone may always display the desktop of the mobile phone. A window interface displayed by the mobile phone in response to an operation instruction from the notebook computer may be displayed in a virtual display.

Scenario 2: The User Performs an Operation on the Mobile Phone Side.

Figure 9A:
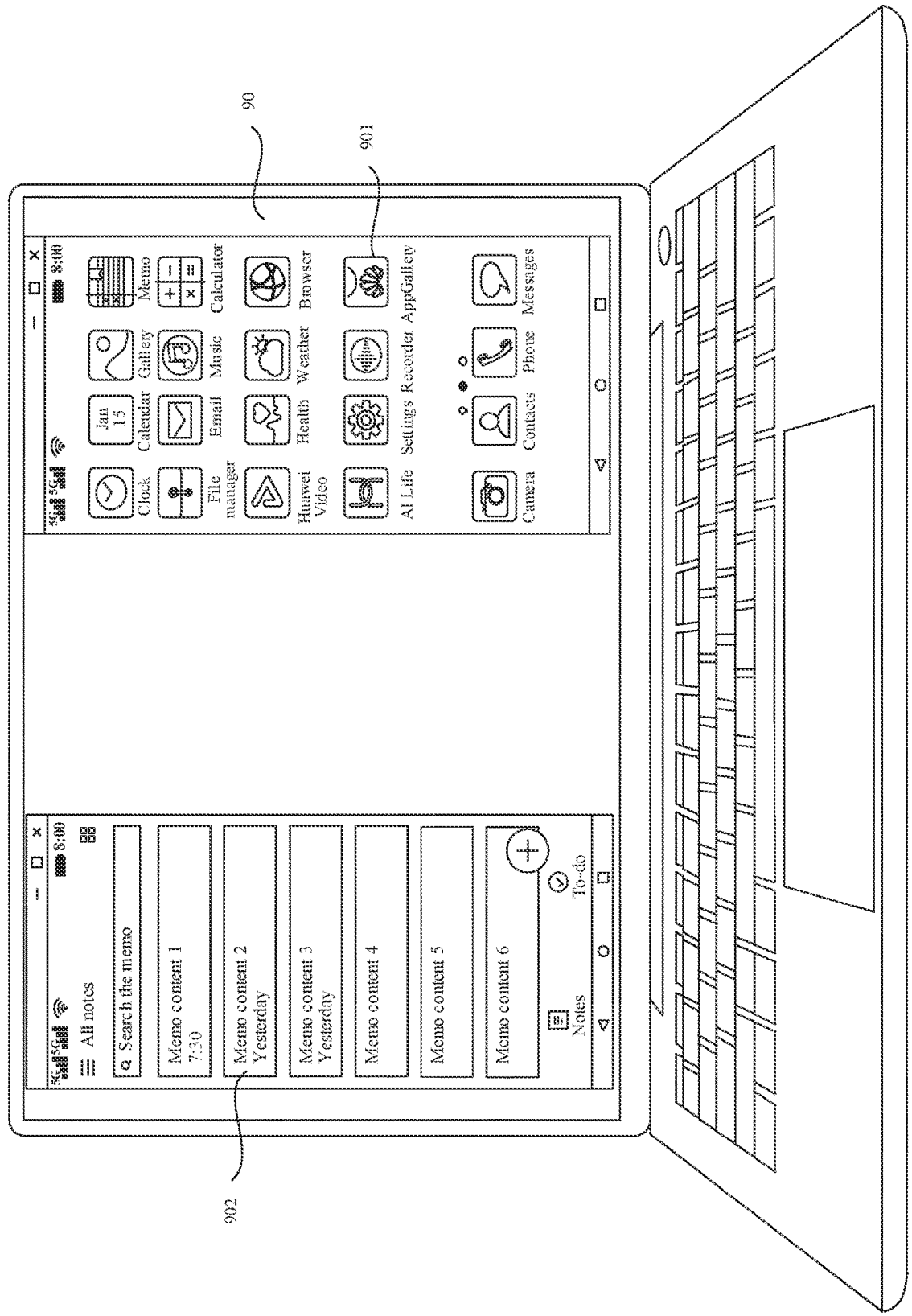
FIG. 9(a) to FIG. 9(c) are an example schematic diagram of a second group of projected interfaces according to an embodiment of this application.
Figure 9B:
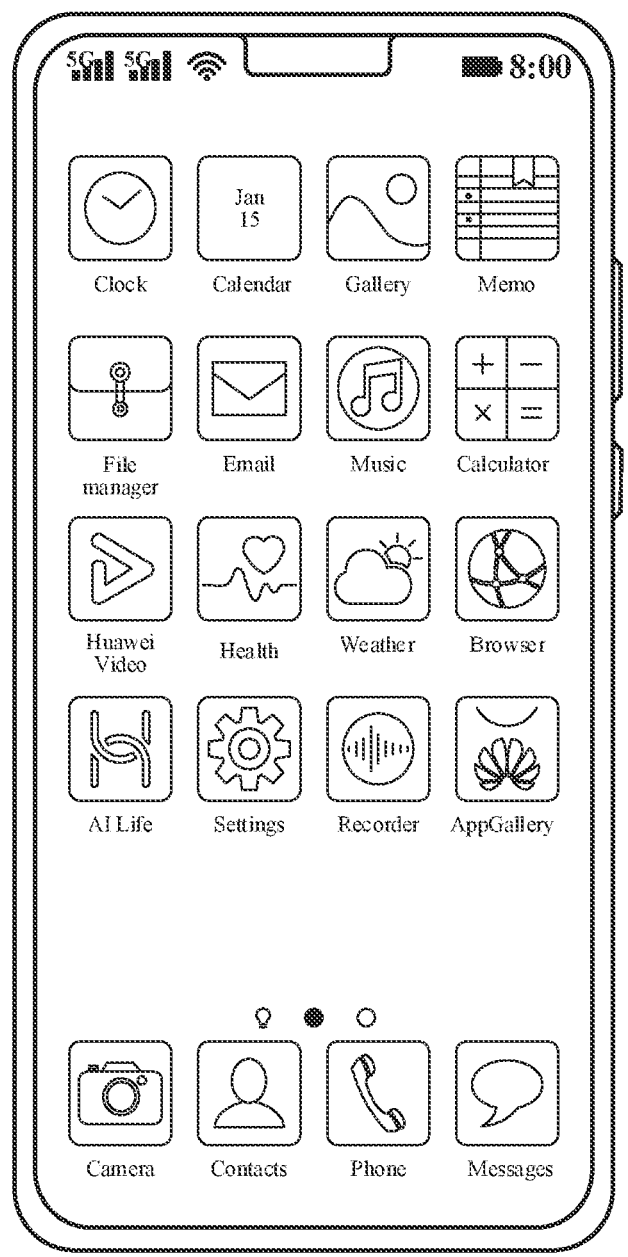
Figure 9C:
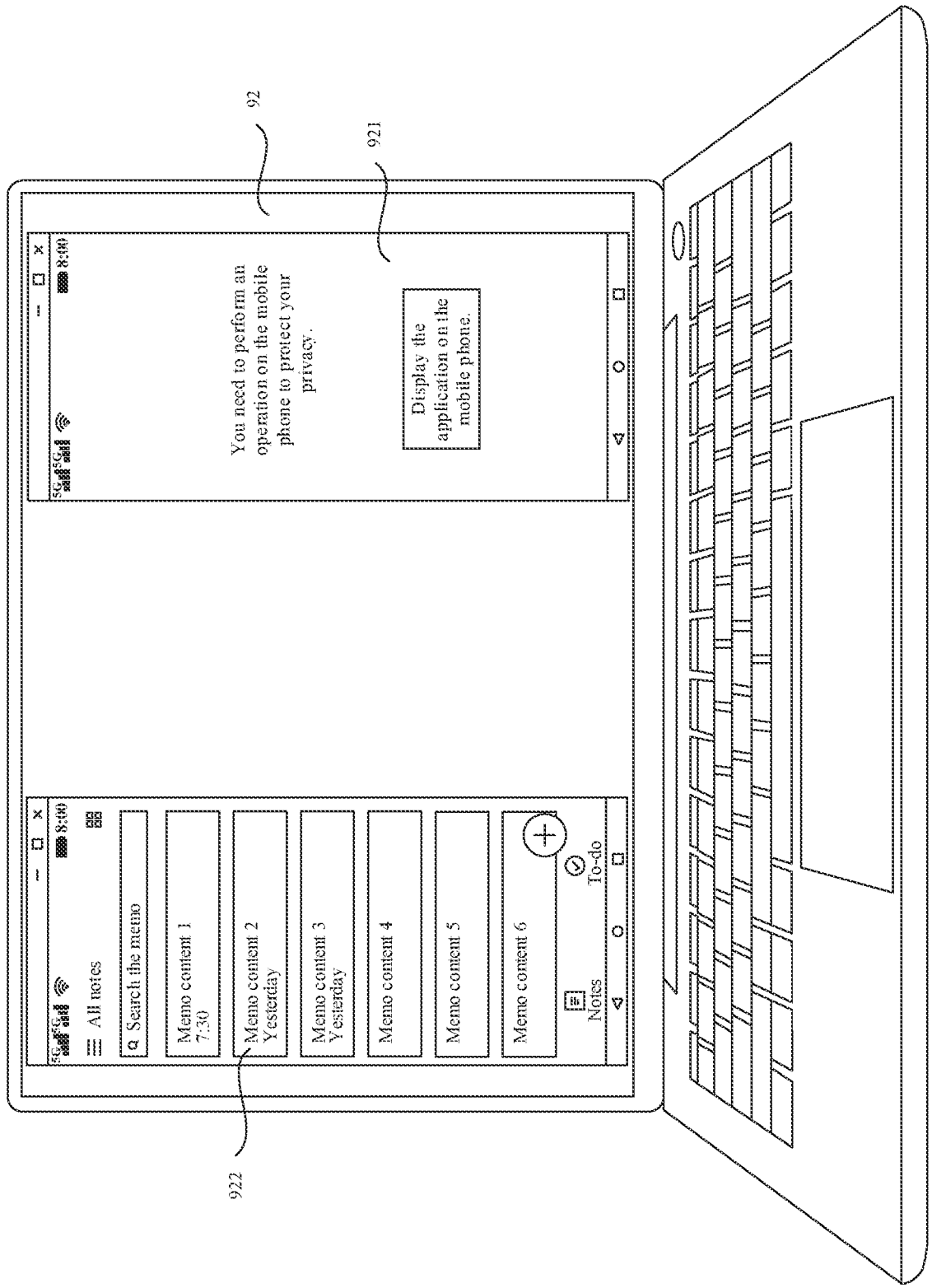
Figure 10A:
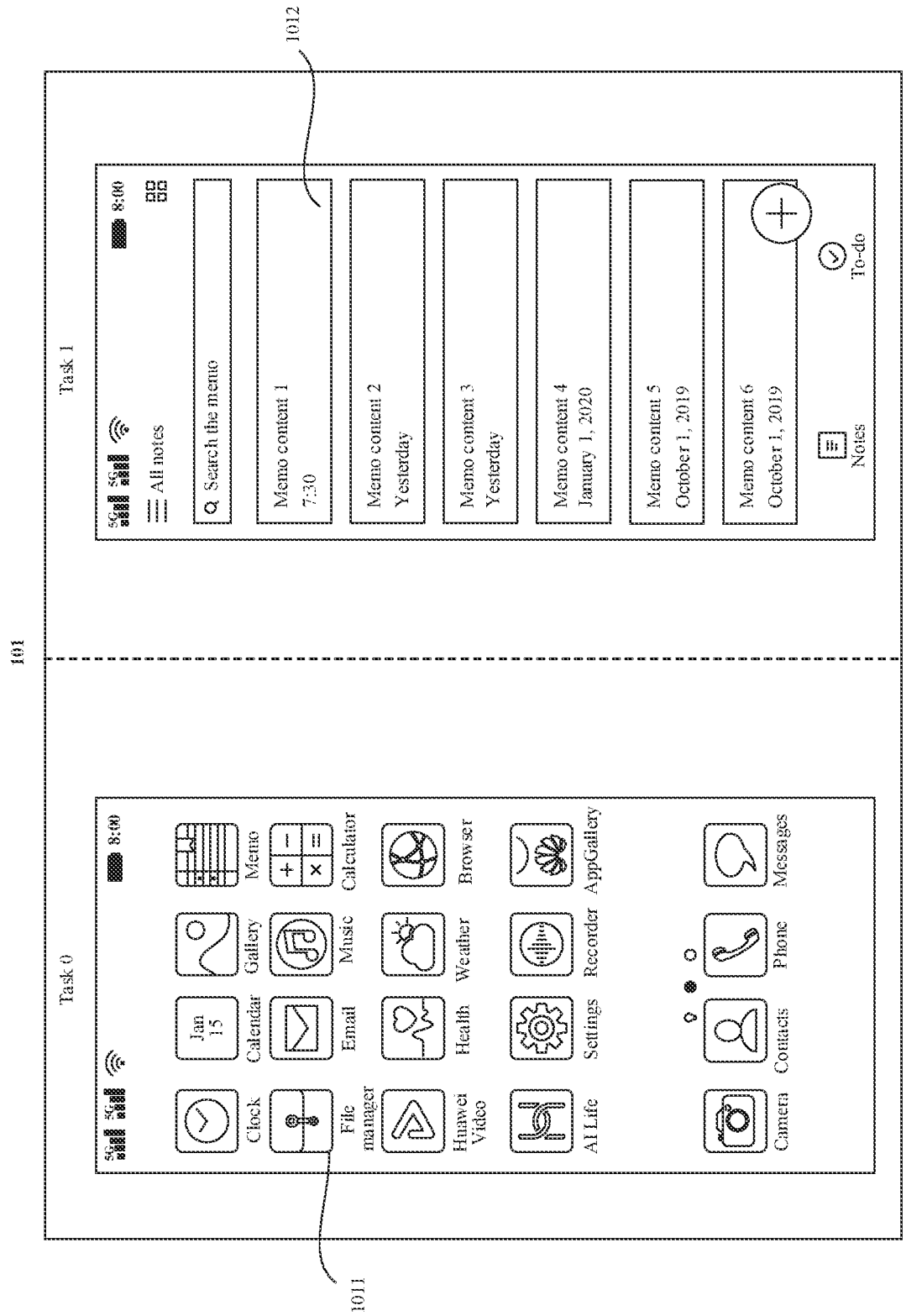
FIG. 10(a) and FIG. 10(b) are an example schematic diagram of a display corresponding to a display interface in FIG. 9(a) to FIG. 9(c) according to an embodiment of this application.
Figure 10B:
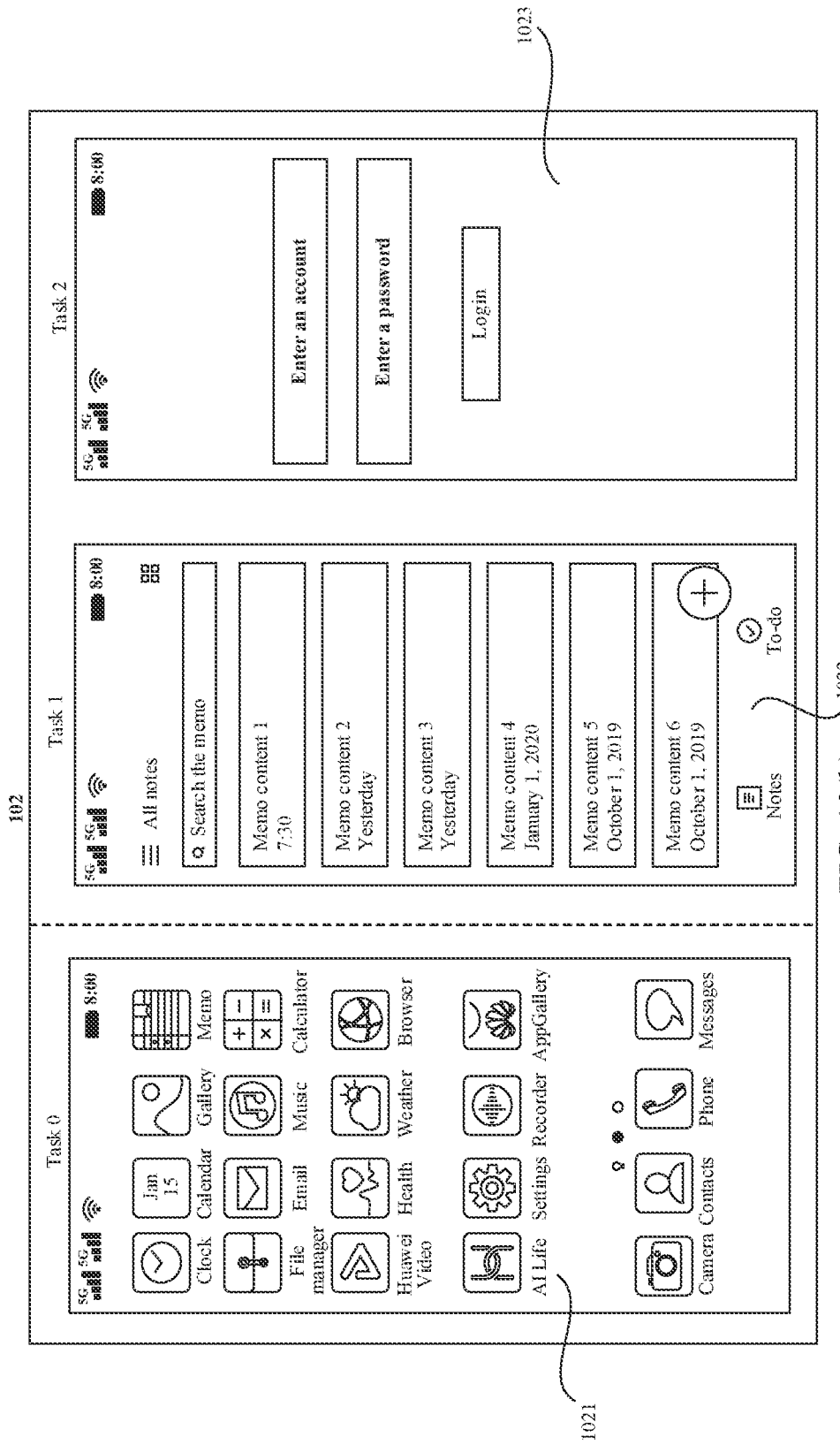

In this embodiment of this application, after receiving a second operation instruction entered by the user, the mobile phone usually displays, on the desktop of the mobile phone, a second APP interface triggered by the instruction. In this way, the desktop of the mobile phone is updated, and a display of the mobile phone is also updated correspondingly. In this case, the mobile phone may project a screen to the notebook computer based on an updated display, so that a projected interface on the notebook computer is updated correspondingly. FIG. 9(a) to FIG. 9(c) show an example display method in the scenario 2. FIG. 10(a) and FIG. 10(b) show a schematic change process of a display on the mobile phone side along with an implementation process shown in FIG. 9(a) to FIG. 9(c).

As shown in FIG. 9(a), a GUI 90 is a display interface on the notebook computer after the mobile phone projects a display 101 shown in FIG. 10(a) to the notebook computer. The GUI 90 includes a projected interface 901 and a projected interface 902. The projected interface 901 is, for example, a projected interface for the desktop of the mobile phone. The projected interface 902 is, for example, a projected interface for a window interface of a memo. The projected interface 701 corresponds to an identifier task 0, and the projected interface 701 corresponds to an identifier task 1.

As shown in FIG. 9(b), a GUI 91 is the desktop of the mobile phone, and the GUI 91 includes an interface element such as a mailbox. After the display 101 is projected to the notebook computer, for example, the mobile phone receives a second operation instruction entered by the user through tapping, where the second operation instruction is used to, for example, start a second APP. The second APP is, for example, a mailbox APP. Further, because the user needs to perform an operation on the mailbox on the mobile phone side, in this embodiment, the mobile phone displays a login interface of the mailbox on the display screen. The login interface of the mailbox is shown in FIG. 12, and details are not described herein. Correspondingly, a window interface corresponding to the desktop of the mobile phone is updated to the login interface of the mailbox, and the display 101 is updated to a display 102 shown in FIG. 10(a). Then the mobile phone projects the display 102 to the notebook computer, so that the GUI 91 on the notebook computer is updated to a GUI 92 shown in FIG. 9(c).

The GUI 92 shown in FIG. 9(c) is a display interface on the notebook computer after the mobile phone projects the display 102 shown in FIG. 10(b) to the notebook computer. The GUI 92 includes a projected interface 921 and a projected interface 922. The projected interface 921 is a projected interface for a window interface of the mailbox, for example, the security interface shown in FIG. 6. The projected interface 922 is, for example, a projected interface for a window interface of the memo. The projected interface 921 corresponds to an identifier task 0, and the projected interface 922 corresponds to an identifier task 1.

As shown in FIG. 10(a), the display 101 includes a window interface 1011 and a window interface 1012. The DMS sets an identifier task 0 for the window interface 1011, and sets an identifier task 1 for the window interface 1012. The window interface 1011 is projected to obtain the projected interface 901 in the GUI 90. The window interface 1012 is projected to obtain the projected interface 90 in the GUI 90. The display 101 is similar to the display 80 shown in FIG. 8(a), and details are not described herein again.

As shown in FIG. 10(b), the display 102 includes a window interface 1021, a window interface 1022, and a window interface 1023. The window interface 1021 is the same as the window interface 1011, and is the desktop of the mobile phone. The window interface 1022 is the same as the window interface 1012, and is an interface of the memo. The window interface 1023 is the login interface of the mailbox, and corresponds to the identifier task 2. That is, after the mobile phone displays the login interface of the mailbox in response to the second operation instruction, the AMS starts the mailbox APP, enters the login interface of the mailbox, and configures the identifier task 2 for the mailbox APP. The DMS performs extension based on the display 101 to obtain the display 102, so as to accommodate the window interface 1023. Further, in this embodiment, the mobile phone may project the window interface 1022 and the window interface 1023 to the notebook computer. In specific implementation, the mobile phone may determine, by using the WMS, that the window interface 1023 is an interface with a security requirement and the window interface 1022 has no security requirement. Then the mobile phone sends the task 1, the task 2, a security protection instruction, and a video stream of the window interface 1012 to the notebook computer. The task 2 corresponds to the security protection instruction, and the task 1 corresponds to the video stream of the window interface 1012. Further, the notebook computer displays the GUI 92.

Based on a same principle as that of the embodiments shown in FIG. 9(a) to FIG. 9(c), FIG. 10(a), and FIG. 10(b), in the embodiment corresponding to FIG. 5C-2, the mobile phone receives an instruction of the user for triggering display of the window interface 561 or an instruction of the user for triggering display of the window interface 561, and the desktop interface of the mobile phone is updated to a window interface with a security requirement. Further, the mobile phone re-projects a screen based on an updated window interface, so that a projected interface corresponding to a task 0 on the notebook computer side is a security interface.

In some other embodiments, if an interface displayed by the mobile phone in response to the second operation instruction has no security requirement, the display screen of the mobile phone displays a window interface without a security requirement. Further, the mobile phone may project an image of the corresponding window interface to the notebook computer. Correspondingly, the notebook computer may display a projected interface for the corresponding window interface and a projected interface for a window interface of the memo.

It can be learned that, in this implementation, the mobile phone associates a to-be-projected window interface with a task ID. After the window interface is updated, the mobile phone may instruct, by using the task ID, the notebook computer to display a projected interface for each window interface, so that the notebook computer can display a projected interface by using a window interface as a unit. In this way, an interface with a security requirement can be securely displayed, and it can also be ensured that the user performs a normal operation on an interface without a security requirement.

Display stage after an operation is performed on the security interface:

Corresponding to the scenario 1, after the notebook computer displays the projected interface for the first APP as a security interface, the user may trigger, by using the notebook computer, a corresponding window interface to be displayed on the display screen of the mobile phone, to continue to perform an operation on the first APP on the mobile phone side. That a window interface of the first APP is displayed on the display screen of the mobile phone and the user continues to perform an operation triggers an update of a display on the mobile phone side, and further triggers a change of a projected interface displayed on the notebook computer side.

Figure 11A:
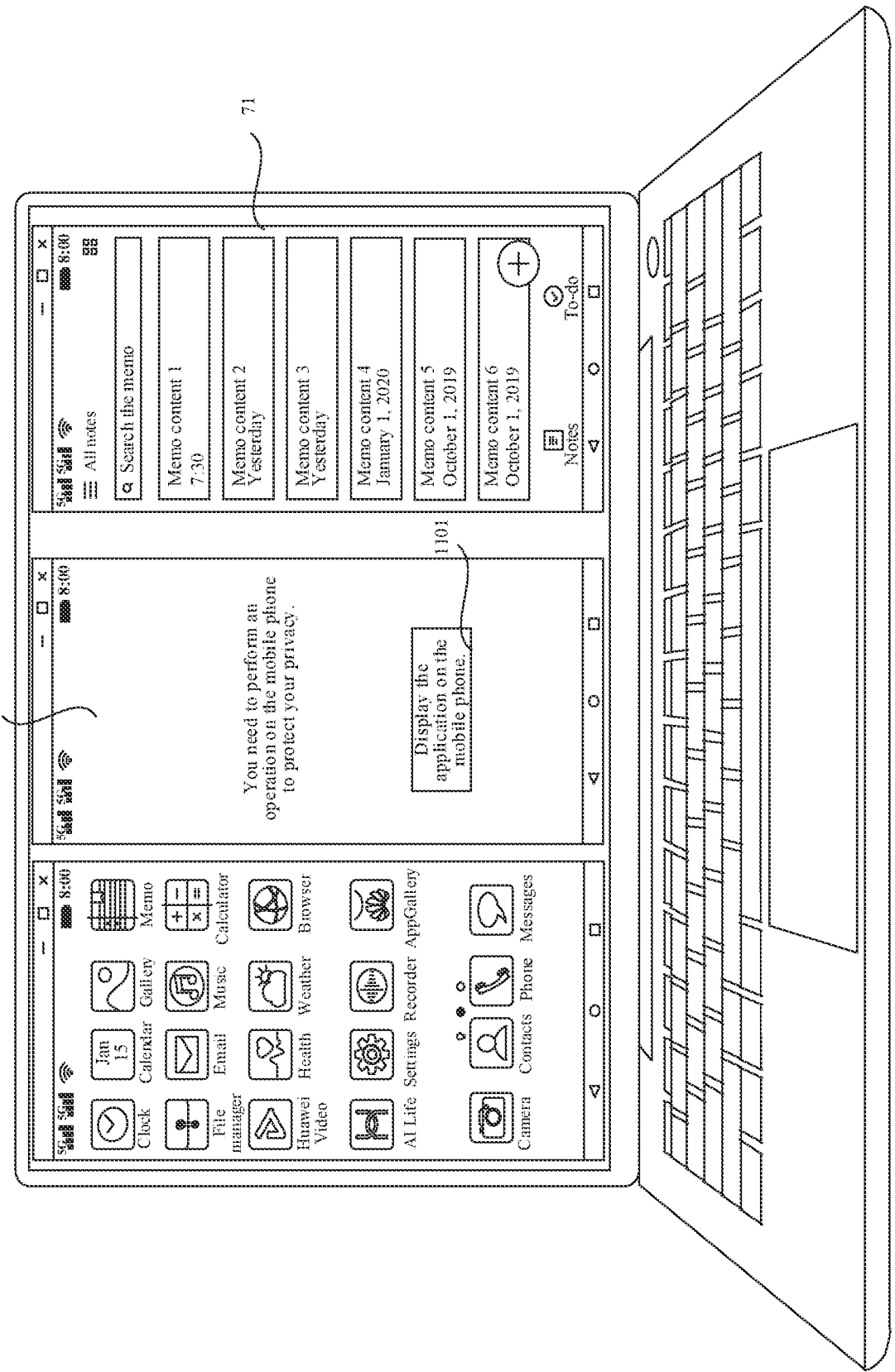
FIG. 11(a) and FIG. 11(b) are an example schematic diagram of a third group of projected interfaces according to an embodiment of this application.
Figure 11B:
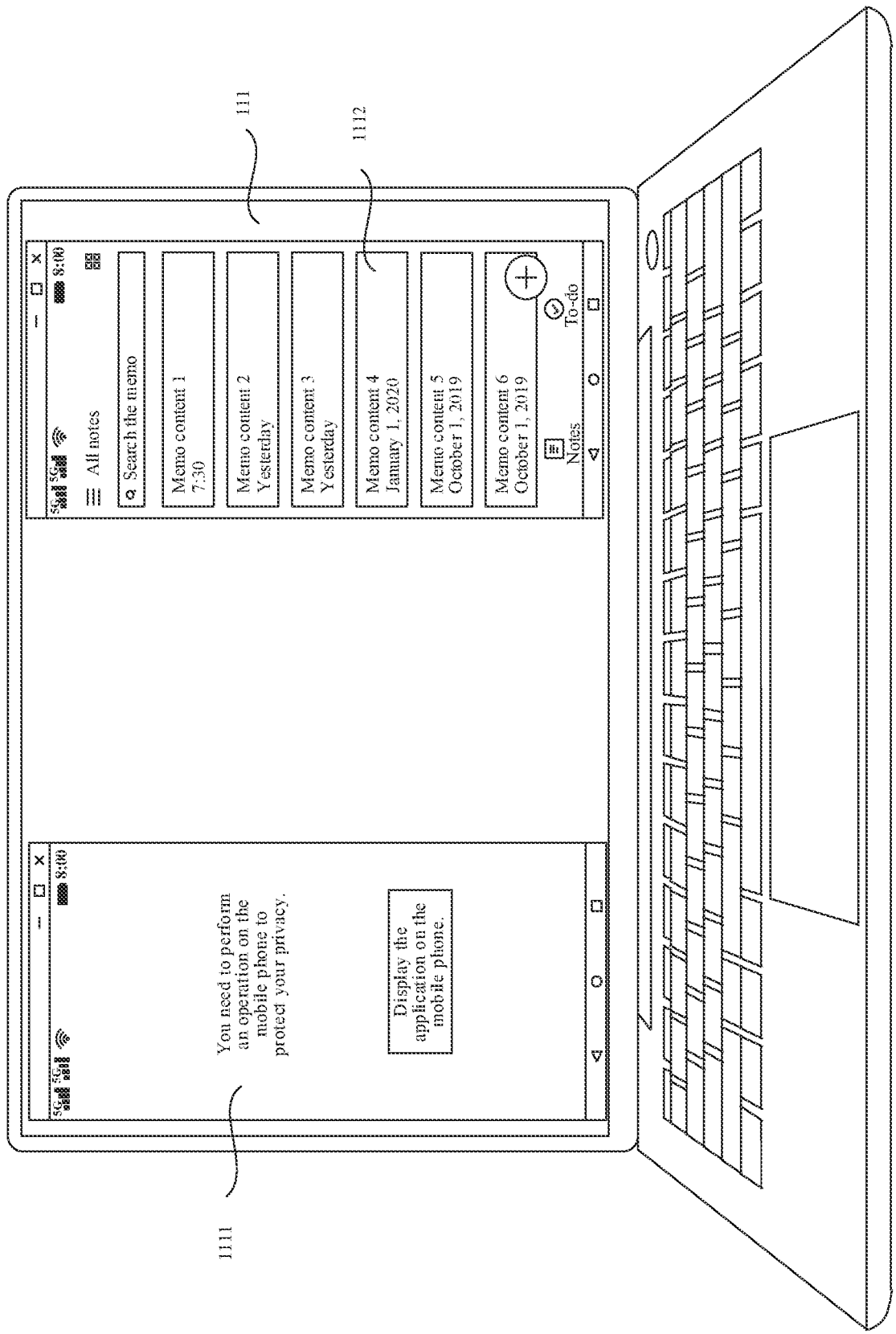

With reference to FIG. 11(a), FIG. 11(b), and FIG. 12, the following describes a display method on the notebook computer and a change process of a display on the mobile phone in a scenario in which a window interface of the first APP is displayed on the display screen of the mobile phone side.

Still refer to the scenario 1. A GUI on the notebook computer in FIG. 11(a) is, for example, the GUI 71, and the projected interface 713 includes an icon 1101. The icon 1101 is the same as the icon 62 in FIG. 6, and details are not described herein again. After receiving an operation of clicking the icon 1101 by the user, the notebook computer generates a third operation instruction. The third operation instruction is used to trigger the mobile phone to display, on the display screen, a login interface of a mailbox shown in FIG. 12, so that the user performs a login operation on the mailbox on the mobile phone side. Further, the window interface 73 in the display 81 on the mobile phone side is displayed on the display screen of the mobile phone, so that the mobile phone displays an interface in FIG. 12. Further, the mobile phone may re-project the window interface 72 and the window interface 73 to the notebook computer based on the display 81, so that the GUI 71 on the notebook computer is updated to the GUI 111 shown in FIG. 11(b).

After receiving a click operation performed by the user, the notebook computer may obtain the identifier task 2 corresponding to the projected interface 713. Then the notebook computer generates a third operation instruction, where the third operation instruction includes the identifier task 2. Further, the mobile phone may determine the login interface of the mailbox based on the identifier task 2.

The GUI 111 shown in FIG. 11(b) is a display interface on the notebook computer after the mobile phone projects the display 81 shown in FIG. 8(b) to the notebook computer. The GUI 111 includes a projected interface 1111 and a projected interface 1112. The projected interface 1111 corresponds to an identifier task 0, and the projected interface 1112 corresponds to an identifier task 1. The projected interface I111 is a projected interface for the login interface of the mailbox, and the projected interface 1111 is the security interface shown in FIG. 6. The projected interface 1112 is a projected interface for a window interface of the memo. The projected interface 1112 is the same as the projected interface 712 in the GUI 71, and details are not described herein again.

With reference to the display 81 shown in FIG. 8(b), in this embodiment, the mobile phone may obtain a video stream of the window interface 72 based on start coordinates of an upper left corner of the window interface 72 and render the video stream, and then send the task 1, the task 2, a rendered video stream, and a security protection instruction to the notebook computer, where the task 1 corresponds to the video stream, and the task 2 corresponds to the security protection instruction. Further, the notebook computer displays the projected interface 1112 corresponding to the task 1 and the projected interface 1111 corresponding to the task 2. It should be noted that, in this embodiment, screen projection information sent by the mobile phone does not include the task 0 and information corresponding to the task 0 (that is, an interface of the desktop of the mobile phone) that are in the display 81. Therefore, the GUI 111 does not include a projected interface corresponding to the task 0. From a perspective of a visual effect for the user, in a process of updating the GUI 71 to the GUI 111, the notebook computer deletes the projected interface 713, and updates the projected interface 711 to the security interface.

A GUI 120 shown in FIG. 12 is the login interface of the mailbox on the mobile phone side. The GUI 120 includes interface elements such as a control 1201 for entering a "mailbox account", a control 1202 for entering a "password", and a "login" button 1203. The control 1202 includes prompt information "Enter a password". A font grayscale value of the prompt information "Enter a password" is small, to prompt the user to enter a login password for the mailbox in the control. After a password entered by the user is received, the prompt information "Enter a password" is hidden. In some embodiments, the control 1201 includes prompt information "Enter a mailbox account". A font grayscale value of the prompt information "Enter a mailbox account" is small, to prompt the user to enter a login account for the mailbox in the control. After an account entered by the user is received, the prompt information "Enter a mailbox account" is hidden. In some other embodiments, the control 1201 includes a login account for the mailbox, and the control 1202 includes prompt information "Enter a password". In a scenario in which the mobile phone displays the GUI 120 on the display screen, a display of the mobile phone is updated from the display 81 to a display 142.

Figure 13:
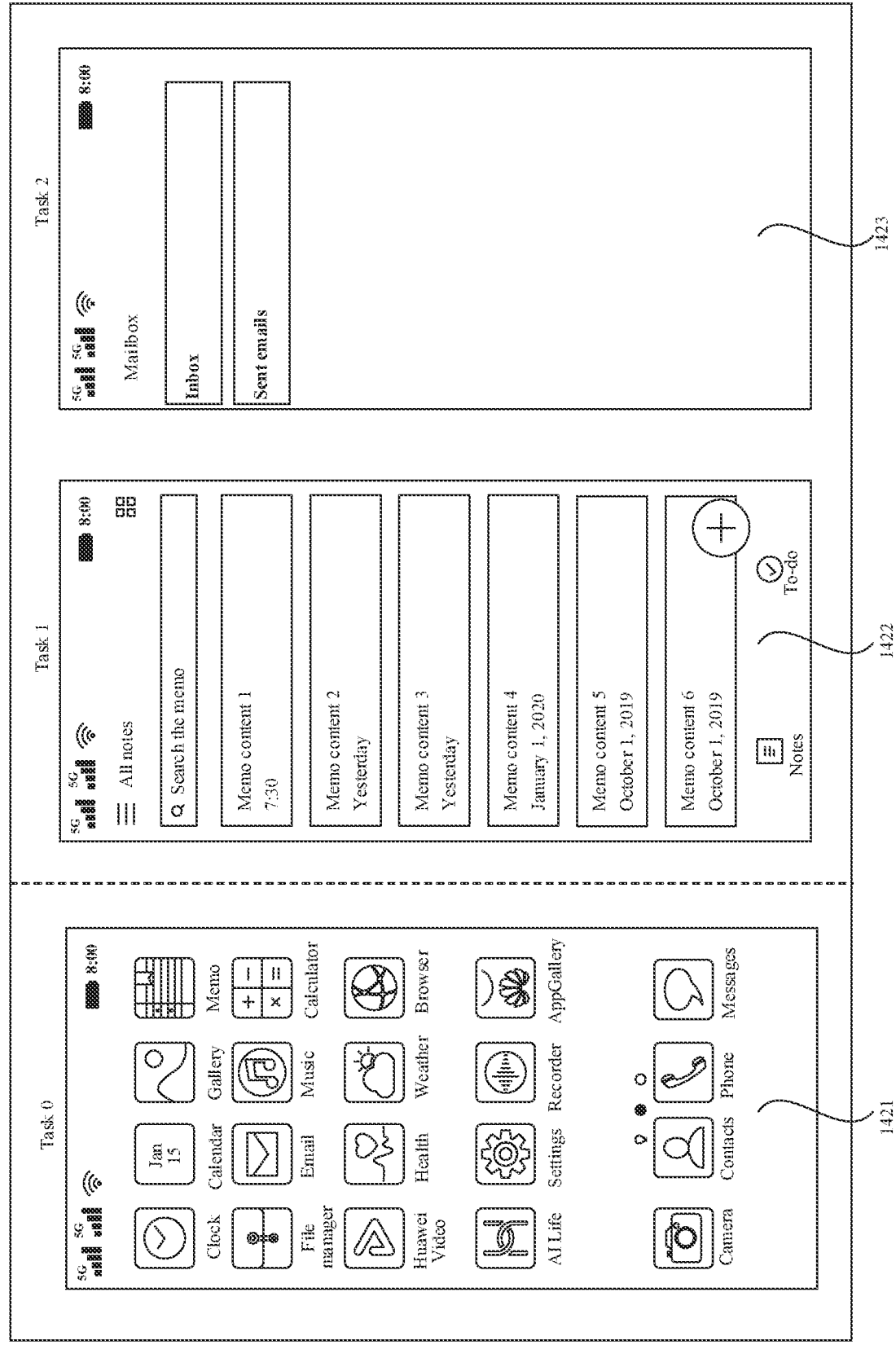
FIG. 13 is an example schematic diagram of a display according to an embodiment of this application.
Figure 14A:
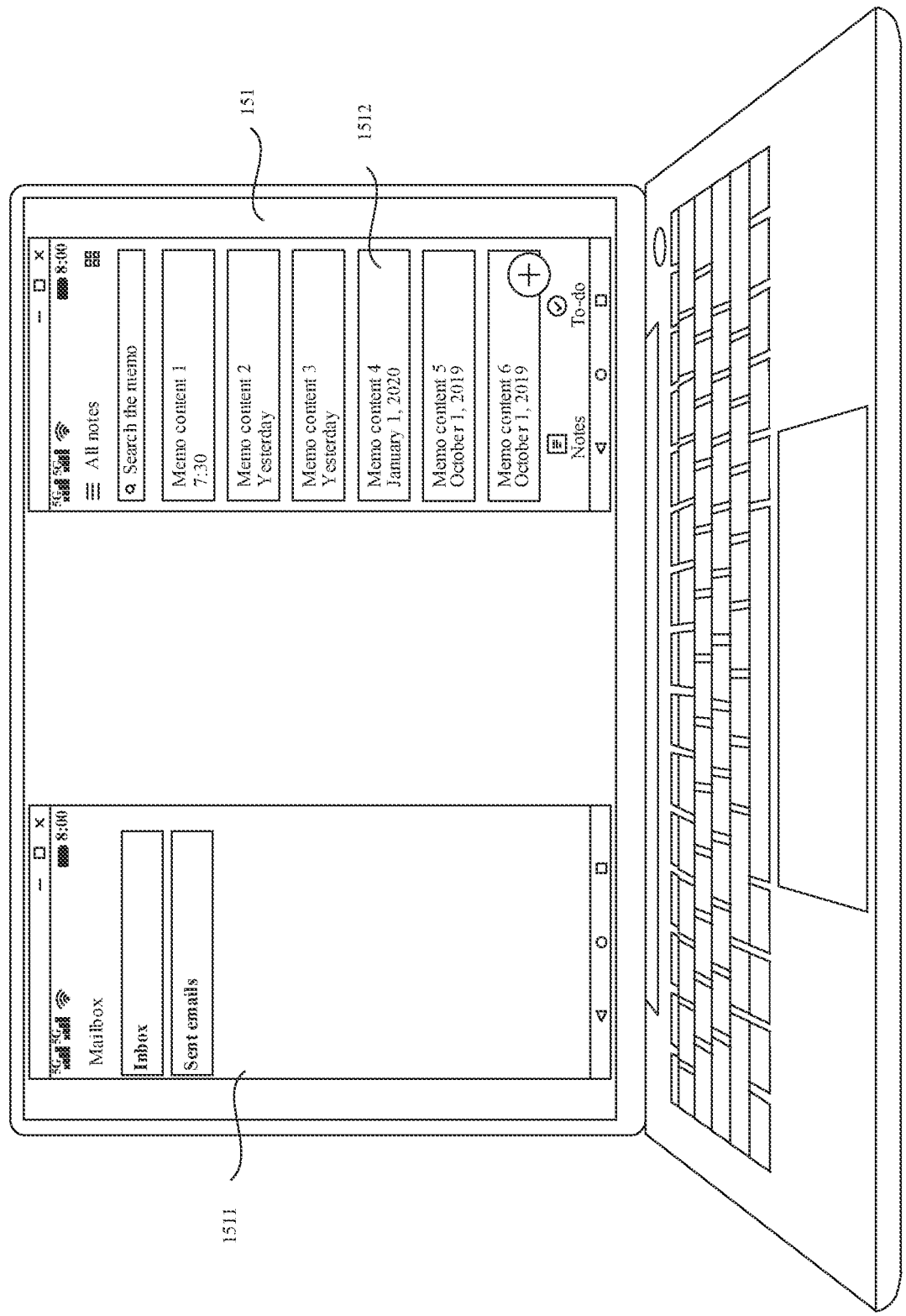
FIG. 14A is a schematic diagram of a first example projected interface of a display shown in FIG. 13 according to an embodiment of this application.
Figure 14B:
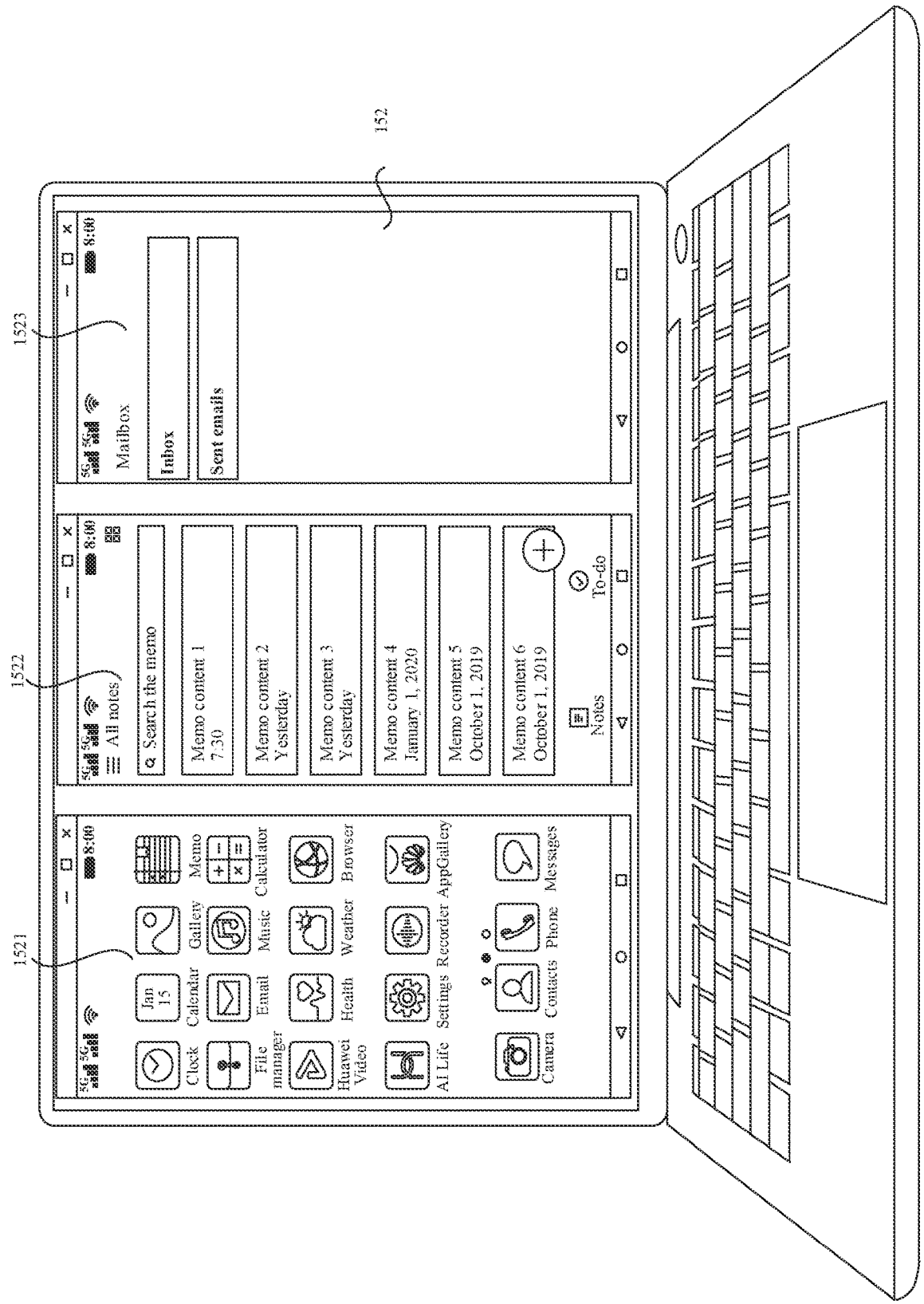
FIG. 14B is a schematic diagram of a second example projected interface of a display shown in FIG. 13 according to an embodiment of this application.

Further, with reference to FIG. 13 to FIG. 14B, the following describes a display method on the notebook computer and a change process of a display on the mobile phone side after the mobile phone receives an operation performed by the user on the first APP.

It should be noted that the implementation scenario corresponding to FIG. 11(b) is the same as the implementation scenario corresponding to FIG. 9(c). Based on this, the following embodiment of the display method is applicable to both the foregoing two implementation scenarios, and descriptions are not repeated in this embodiment of this application.

With reference to FIG. 12, the mobile phone may receive a login instruction entered by the user by tapping the button 1203, where the login instruction includes a mailbox account and a password that are entered by the user. After determining that the corresponding mailbox account and password are correct, the AMS invokes an activity of a main interface of the mailbox. Correspondingly, the mobile phone displays the main interface of the mailbox. The main interface of the mailbox is shown in a window interface identified by a task 2 in FIG. 13.

The display 142 shown in FIG. 13 includes a window interface 1421, a window interface 1422, and a window interface 1423. The window interface 1421 corresponds to an identifier task 0, and is the desktop of the mobile phone. The window interface 1422 corresponds to a task 1, and is a window interface of the memo. The window interface 1423 corresponds to the task 2, and is a window interface of the main interface of the mailbox. In this embodiment, after determining that both the mailbox account and the password are correct, the DMS may control the login interface corresponding to the task 0 in the display 81 to be closed or hidden, and display the main interface of the mailbox by using a new window interface. In this way, a window interface identified by the task 0 is updated to the desktop of the mobile phone, and a new window interface is added. Further, the AMS configures the identifier task 2 for the new window interface, to obtain the display 142 shown in FIG. 13.

In some embodiments, the mobile phone may project the window interface 1422 and the window interface 1423 in the display 142 to the notebook computer side, to obtain a GUI 151 shown in FIG. 14A. In some other embodiments, the mobile phone may project all window interfaces in the display 142 to the notebook computer side, to obtain a GUI 152 shown in FIG. 14B.

As shown in FIG. 14A, the GUI 151 includes a projected interface 1511 and a projected interface 1512. The projected interface 1511 corresponds to the task 1, and is a projected interface for the window interface 1422 in the display 142. The projected interface 1512 corresponds to the task 2, and is a projected interface for the window interface 1423 in the display 142.

As shown in FIG. 14B, the GUI 152 includes a projected interface 1521, a projected interface 1522, and a projected interface 1523. The projected interface 1521 corresponds to the task 0, and is a projected interface for the window interface 1421 in the display 142. The projected interface 1522 corresponds to the task 1, and is a projected interface for the window interface 1422 in the display 142. The projected interface 1523 corresponds to the task 2, and is a projected interface for the window interface 1423 in the display 142.

It should be noted that the foregoing interaction of information and instructions between the mobile phone and the notebook computer may be all based on the Wi-Fi Direct technology.

It may be understood that FIG. 5A(1) and FIG. 5A(2) to FIG. 14B are merely examples for description, and do not constitute a limitation on embodiments of this application. In some other embodiments, the foregoing embodiments of the display method are also applicable to display of another APP on the mobile phone, and details are not described herein again. In addition, the GUIs in the foregoing scenarios may vary depending on different mobile phone models, different versions of installed systems, and the like. Details are not described herein.

In addition, the mobile phone and the notebook computer are merely used as examples for describing the foregoing embodiments, and do not constitute a limitation on embodiments of this application. In some other embodiments, the first device included in embodiments of this application may alternatively be implemented as a device with a foldable screen, a tablet computer, or the like, and the second device included in embodiments of this application may alternatively be implemented as a smart screen or the like. This is not limited herein.

The following describes an overall process of a display method included in embodiments of this application by using an example in which the first device is implemented as a mobile phone and the second device is implemented as a PC.

Figure 15:
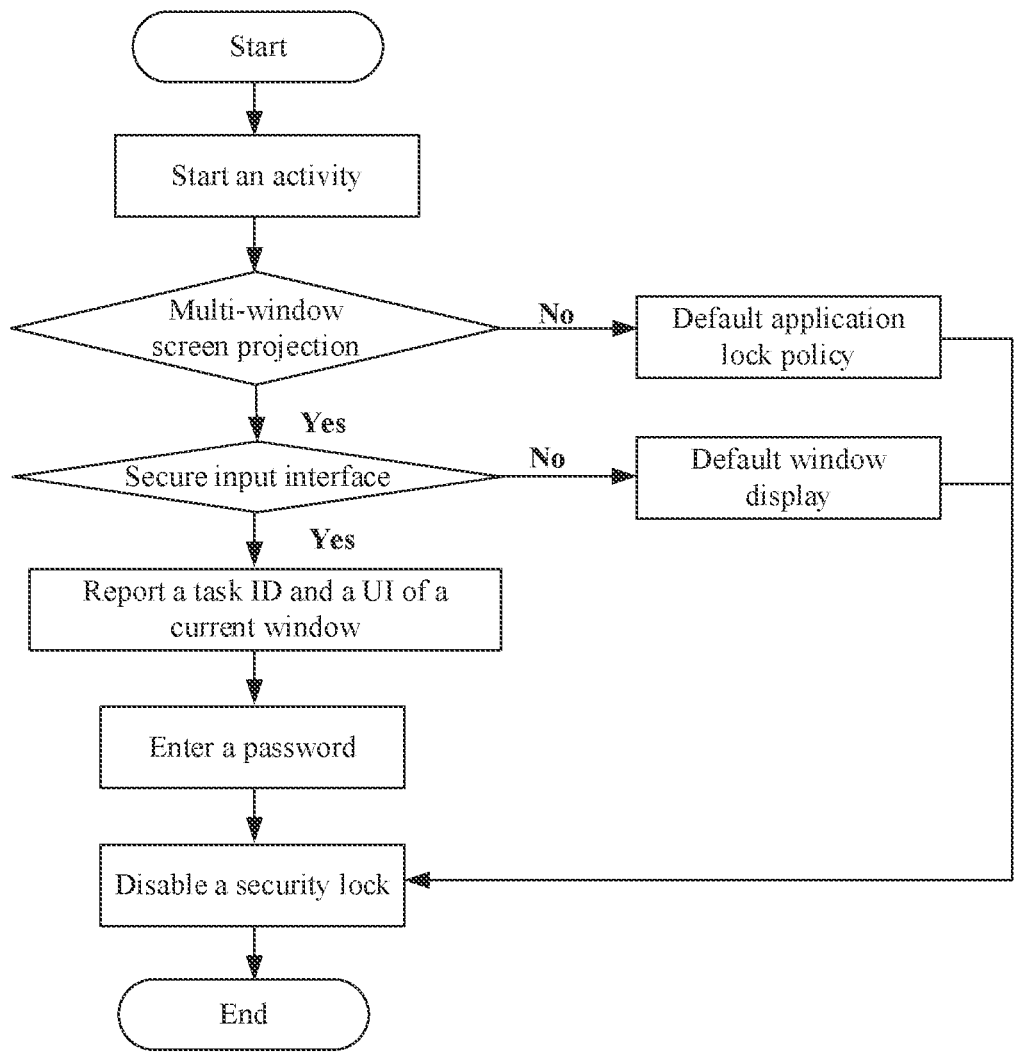
FIG. 15 is a schematic diagram of third example signaling interaction in a display method according to an embodiment of this application.

FIG. 15 shows a third example display method according to this application. In some embodiments, multi-screen collaboration is performed on a mobile phone side. First, the mobile phone side determines whether multi-screen collaboration is currently performed. If multi-screen collaboration is not being performed, the mobile phone uses a default application lock policy (that is, the mobile phone side does not send a video stream to the PC side). If multi-screen collaboration is being performed, the mobile phone side determines whether a secure input interface is being displayed. If no secure input interface is being displayed, the mobile phone uses a default window for display. If a secure input interface is being displayed, the mobile phone sends, to the PC, a task ID corresponding to an application on the secure input interface and a cover image (optionally, the cover image is alternatively pre-stored on the PC). After a user enters a password (a flag corresponding to a window state is reset), the mobile phone notifies the PC. The PC cancels covering of an application window corresponding to the secure input interface.

It may be understood that, compared with a conventional solution in which content in a display is not projected to a peer device when a security flag bit flag is detected, in the solution in this embodiment of this application, content in a display is projected to a peer device regardless of whether a security flag bit flag exists. In addition, a security flag bit flag is also transmitted, to indicate the PC to cover a window with the security flag bit flag by using a security layer, so as to implement security assurance for a plurality of windows in multi-screen collaboration.

To sum up, in the display method in embodiments of this application, before screen projection, the first device determines whether each window interface has a security requirement, and then the first device sends a task ID of each window interface and screen projection information of the window interface to the second device based on a detection result. The second device displays, based on the task ID, a security interface and a projected interface including content of the window interface, where the security interface is a projected interface for a window interface with a security requirement. In this way, the second device can securely display an interface with a security requirement, and it can also be ensured that the user performs a normal operation on an interface without a security requirement.

Although preferred embodiments of this application are described, persons skilled in the art can make changes and modifications to these embodiments after they learn of a basic inventive concept. Therefore, the appended claims are intended to be construed as including the preferred embodiments and all changes and modifications that fall within the scope of this application.

It is clearly that persons skilled in the art can make various modifications and variations to this application without departing from the spirit and scope of this application. This application is intended to cover these modifications and variations of this application provided that they fall within the scope of the claims of this application and equivalent technologies thereof

What is claimed is:

1. A display method, comprising:
running, by a first device, a second application in response to an instruction;
determining, by the first device, that the second application comprises no security flag;
sending, by the first device to a second device and in response to determining the second application comprises no security flag, the second application to display as a projected interface;
receiving an operation on the second application or the projected interface, wherein the operation triggers the second application to display a second interface;
determining, by the first device, that the second application comprises the security flag; and
sending, by the first device to the second device and in response to determining that the second application comprises the security flag, a security protection instruction and a task identity corresponding to the second application,
wherein the security protection instruction instructs the second device to update the display of the projected interface for the second application as a security interface.

2. The display method of claim 1, wherein running the second application in response to the instruction comprises:
receiving, by the first device, a first operation instruction from the second device, wherein the first operation instruction is associated with a first application, and wherein the second application is a window interface of the first application; and
running, by the first device, the first application to start the second application.

3. The display method of claim 1, wherein running the second application in response to the instruction comprises:
receiving, by the first device, a second operation instruction entered by a user, wherein the second operation instruction corresponds to a first application, and wherein the second application is a window interface of the first application;
running, by the first device, the first application; and
displaying, by the first device, the second application.

4. The display method of claim 1, wherein after sending the security protection instruction and the task identity corresponding to the second application, the display method further comprises:
receiving, by the first device, a third operation instruction from the second device, wherein the third operation instruction comprises the task identity corresponding to the second application;
displaying, by the first device, the second application in response to the third operation instruction;
receiving, by the first device, operation information entered by a user based on the second application;
updating, by the first device, the second application to a third application; and
projecting, by the first device, the third application to the second device.

5. The display method of claim 1, wherein determining that the second application comprises the security flag comprises:
invoking, by the first device, a window manager service of the first device to traverse a window state of the second application; and
determining, by the first device when the window state of the second application comprises a second security flag, that the second application comprises the security flag.

6. The display method of claim 5, wherein the security flag comprises a first flag, a second flag, and a third flag, wherein the first flag indicates an application security lock, wherein the second flag indicates that setting is automatically performed by an application, and wherein the third flag indicates that a security keyboard is invoked.

7. The display method of claim 1, further comprising:
receiving, by the first device, a screen projection instruction entered by a user; and
projecting, by the first device, a first window interface to the second device in response to the screen projection instruction.

8. The display method of claim 1, wherein the security interface includes first prompt information configured to prompt a user to perform operations on the first device.

9. The display method of claim 1, wherein the security interface includes second prompt information configured to prompt a user to display the second application on the first device, and wherein the method further comprises:
receiving, by the first device, information associated with a first operation performed by the user in response to the second prompt information; and
displaying, by the first device, the second interface.

10. The display method of claim 1, further comprising:
sending, by the first device to the second device, a first wallpaper of the first device for displaying an image associated with the first wallpaper on the security interface, wherein the image associated with the first wallpaper is a first image of the first wallpaper that has been subjected to Gaussian blur processing;
switching, by the first device, from displaying the first wallpaper to displaying a second wallpaper; and
sending, by the first device to the second device, the second wallpaper for displaying a second image associated with the second wallpaper on the security interface.

11. A first device, comprising:
a memory configured to store computer instructions; and
a processor coupled to the memory and configured to execute the computer instructions to cause the first device to:
run a second application in response to an instruction;
determine that the second application comprises no security flag;
send, in response to determining the second application comprises no security flag, the second application to a second device to display as a projected interface;
receive an operation on the second application or the projected interface, wherein the operation triggers the second application to display a second interface;
determine that the second application comprises the security flag; and
send, in response to the second application comprising the security flag, a security protection instruction and a task identity corresponding to the second application to the second device,
wherein the security protection instruction instructs the second device to update the display of the projected interface for the second application as a security interface.

12. The first device of claim 11, wherein the processor is further configured to execute the computer instructions to cause the first device to:

receive a first operation instruction from the second device, wherein the first operation instruction is associated with a first application, and wherein the second application is a window interface of the first application; and run the first application to start the second application.

13. The first device of claim 11, wherein the processor is further configured to execute the computer instructions to cause the first device to:

receive a second operation instruction entered by a user, wherein the second operation instruction corresponds to a first application, and wherein the second application is a window interface of the first application;

run the first application; and display the second application.

14. The first device of claim 11, wherein the processor is further configured to execute the computer instructions to cause the first device to:

receive a third operation instruction from the second device, wherein the third operation instruction comprises the task identity corresponding to the second application;

display the second application in response to the third operation instruction;

receive operation information entered by a user based on the second application;

update the second application to a third application; and project the third application to the second device.

15. The first device of claim 11, wherein the processor is further configured to execute the computer instructions to cause the first device to:

invoke a window manager service of the first device to traverse a window state of the second application; and determine, when the window state of the second application comprises a second security flag, that the second application comprises the security flag.

16. The first device of claim 15, wherein the security flag comprises a first flag, a second flag, and a third flag, wherein the first flag indicates an application security lock, wherein the second flag indicates that setting is automatically performed by an application, and wherein the third flag indicates that a security keyboard is invoked.

17. A non-transitory computer-readable storage medium, comprising a computer program, wherein when the computer program runs on a first device, the first device is enabled to:

run a second application in response to an instruction;

determine that the second application comprises no security flag;

send, in response to determining the second application comprises no security flag, the second application to a second device to display as a projected interface;

receive an operation on the second application or the projected interface, wherein the operation triggers the second application to display a second interface;

determine that the second application comprises the security flag; and send, in response to the second application comprising the security flag, a security protection instruction and a task identity corresponding to the second application to the second device, wherein the security protection instruction instructs the second device to update the display of the projected interface for the second application as a security interface.

18. The non-transitory computer-readable storage medium of claim 17, wherein the first device is further enabled to:

receive a first operation instruction from the second device, wherein the first operation instruction is associated with a first application, and wherein the second application is a window interface of the first application; and run the first application to start the second application.

19. The non-transitory computer-readable storage medium of claim 17, wherein the first device is further enabled to:

receive a second operation instruction entered by a user, wherein the second operation instruction corresponds to a first application, and wherein the second application is a window interface of the first application;

run the first application; and display the second application.

20. The non-transitory computer-readable storage medium of claim 17, wherein the first device is further enabled to:

receive a third operation instruction from the second device, wherein the third operation instruction comprises the task identity corresponding to the second application;

display the second application in response to the third operation instruction;

receive operation information entered by a user based on the second application;

update the second application to a third application; and project the third application to the second device.

21. The non-transitory computer-readable storage medium of claim 17, wherein the first device is further enabled to:

invoke a window manager service of the first device to traverse a window state of the second application; and determine, when the window state of the second application comprises a second security flag, that the second application comprises the security flag.

22. The non-transitory computer-readable storage medium of claim 21, wherein the security flag comprises a first flag, a second flag, and a third flag, wherein the first flag indicates an application security lock, wherein the second flag indicates that setting is automatically performed by an application, and wherein the third flag indicates that a security keyboard is invoked.

* * * * *